(12) United States Patent
Takimoto et al.

(10) Patent No.: US 12,328,130 B2
(45) Date of Patent: Jun. 10, 2025

(54) RADIO FREQUENCY MODULE AND COMMUNICATION DEVICE

(71) Applicant: Murata Manufacturing Co., Ltd., Kyoto (JP)

(72) Inventors: Kensuke Takimoto, Kyoto (JP); Yoshihiro Yoshimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/053,431

(22) Filed: Nov. 8, 2022

(65) Prior Publication Data

US 2023/0063118 A1 Mar. 2, 2023

Related U.S. Application Data

(63) Continuation of application No. PCT/JP2021/019444, filed on May 21, 2021.

(30) Foreign Application Priority Data

Jun. 12, 2020 (JP) ................................ 2020-102570

(51) Int. Cl.
*H04B 1/00* (2006.01)

(52) U.S. Cl.
CPC ........... *H04B 1/006* (2013.01); *H04B 1/0028* (2013.01)

(58) Field of Classification Search
CPC ........ H04B 1/006; H04B 1/0028; H04B 1/00; H04B 1/48

(Continued)

(56) References Cited

U.S. PATENT DOCUMENTS

| 6,233,227 B1 * | 5/2001 | Izumi | H04B 1/405 370/280 |
| 6,356,536 B1 * | 3/2002 | Repke | H04B 1/48 370/282 |

(Continued)

FOREIGN PATENT DOCUMENTS

| CN | 107317665 A | 11/2017 |
| JP | 2010-528498 A | 8/2010 |

(Continued)

OTHER PUBLICATIONS

International Search Report for PCT/JP2021/019444 dated Aug. 10, 2021.

*Primary Examiner* — Tanmay K Shah
(74) *Attorney, Agent, or Firm* — McDonald Hopkins LLC

(57) ABSTRACT

A radio frequency module and a communication device capable of further suppressing a decrease in reception sensitivity are provided. A radio frequency module includes a switch (second switch), a reception filter (second reception filter), a low-noise amplifier (second low-noise amplifier), and a filter (second filter). The switch is configured to change over between a transmission path of a transmission signal and a reception path of a reception signal in communication based on a time division duplex system. The reception filter is provided at a subsequent stage of the switch and is configured to pass the reception signal in a predetermined frequency band. The low-noise amplifier is configured to amplify the reception signal that has passed through the reception filter. The filter is provided at a preceding stage of the switch in the reception path (second reception path).

15 Claims, 11 Drawing Sheets

(58) Field of Classification Search
USPC .................................................... 455/512.1
See application file for complete search history.

(56) References Cited

U.S. PATENT DOCUMENTS

| | | | |
|---|---|---|---|
| 10,389,310 B2* | 8/2019 | Nakajima | H03F 3/24 |
| 2009/0068963 A1 | 3/2009 | Cabanillas et al. | |
| 2009/0098905 A1* | 4/2009 | Kanou | H04B 1/18 |
| | | | 455/552.1 |
| 2010/0135193 A1 | 6/2010 | Przadka | |
| 2010/0273431 A1* | 10/2010 | Fraser | H04B 1/0028 |
| | | | 455/67.11 |
| 2018/0270006 A1* | 9/2018 | Gao | H04W 72/0446 |
| 2019/0036566 A1* | 1/2019 | Hirobe | H04B 1/44 |
| 2019/0181907 A1* | 6/2019 | Pfann | H03H 9/542 |
| 2020/0313703 A1* | 10/2020 | Choi | H04B 1/04 |

FOREIGN PATENT DOCUMENTS

| | | |
|---|---|---|
| JP | 2010-539798 A | 12/2010 |
| JP | 2015-133570 A | 7/2015 |
| JP | 2019-029700 A | 2/2019 |

* cited by examiner

RADIO FREQUENCY MODULE AND COMMUNICATION DEVICE

CROSS REFERENCE TO RELATED APPLICATION

This is a continuation of International Application No. PCT/JP2021/019444 filed on May 21, 2021 which claims priority from Japanese Patent Application No. 2020-102570 filed on Jun. 12, 2020. The contents of these applications are incorporated herein by reference in their entireties.

BACKGROUND ART

Technical Field

The present disclosure generally relates to a radio frequency module and a communication device, and more particularly to a radio frequency module and a communication device that communicate based on a time division duplex system.

A radio frequency front-end circuit (radio frequency module) capable of suppressing a decrease in reception sensitivity has been known (see Patent Document 1).

The radio frequency front-end circuit of Patent Document 1 includes a transmission circuit and a reception circuit, and transmits and receives at the same time. The transmission circuit includes a transmission filter to pass a signal in a transmission frequency band, and the reception circuit includes a reception filter to pass a signal in a reception frequency band different from the transmission frequency band, a low-noise amplifier that inputs and amplifies a signal outputted from the reception filter, and a filter circuit connected between the reception filter and the low-noise amplifier. The filter circuit attenuates a signal of a frequency indicating a difference between a center frequency of a transmission frequency band and a center frequency of a reception frequency band among signals inputted to the low-noise amplifier.

Patent Document 1: Japanese Unexamined Patent Application Publication No. 2019-29700

BRIEF SUMMARY

In a configuration of a radio frequency front-end circuit (radio frequency module), there is a case that a switch for changing over a path of a signal is provided at a preceding stage of a reception filter or a transmission/reception filter to pass a reception signal in a predetermined frequency band. In the case above, a harmonic wave of a signal in a band lower than the reception frequency band is generated because of nonlinear characteristics of the switch. Accordingly, when a signal in the reception frequency band passes through the reception filter, there is a possibility that reception sensitivity decreases. In the radio frequency front-end circuit (radio frequency module) of Patent Document 1, a harmonic wave generated by switching of a switch cannot be removed. In the case above, in the radio frequency front-end circuit (radio frequency module) of Patent Document 1, reception sensitivity decreases.

The present disclosure provides a radio frequency module and a communication device capable of further suppressing a decrease in reception sensitivity.

A radio frequency module according to an aspect of the present disclosure includes a switch, a reception filter, a low-noise amplifier, and a filter. The switch is configured to change over between a transmission path of a transmission signal and a reception path of a reception signal in communication based on a time division duplex system. The reception filter is provided at a subsequent stage of the switch and is configured to pass the reception signal in a predetermined frequency band. The low-noise amplifier is configured to amplify the reception signal that has passed through the reception filter. The filter is provided at a preceding stage of the switch in the reception path.

A radio frequency module according to an aspect of the present disclosure includes a switch, a transmission/reception filter, a low-noise amplifier, and a filter. The switch is configured to change over a connection destination of an antenna terminal. The transmission/reception filter is provided at a subsequent stage of the switch and is configured to pass a reception signal in a predetermined frequency band and a transmission signal in the predetermined frequency band. The low-noise amplifier is configured to amplify the reception signal that has passed through the transmission/reception filter. The filter is provided at a preceding stage of the switch in a reception path of the reception signal.

A communication device according to an aspect of the present disclosure includes the radio frequency module and a signal processing circuit configured to process a signal passing through the radio frequency module.

According to the present disclosure, a decrease in reception sensitivity may further be suppressed.

DETAILED DESCRIPTION

Figure 1:
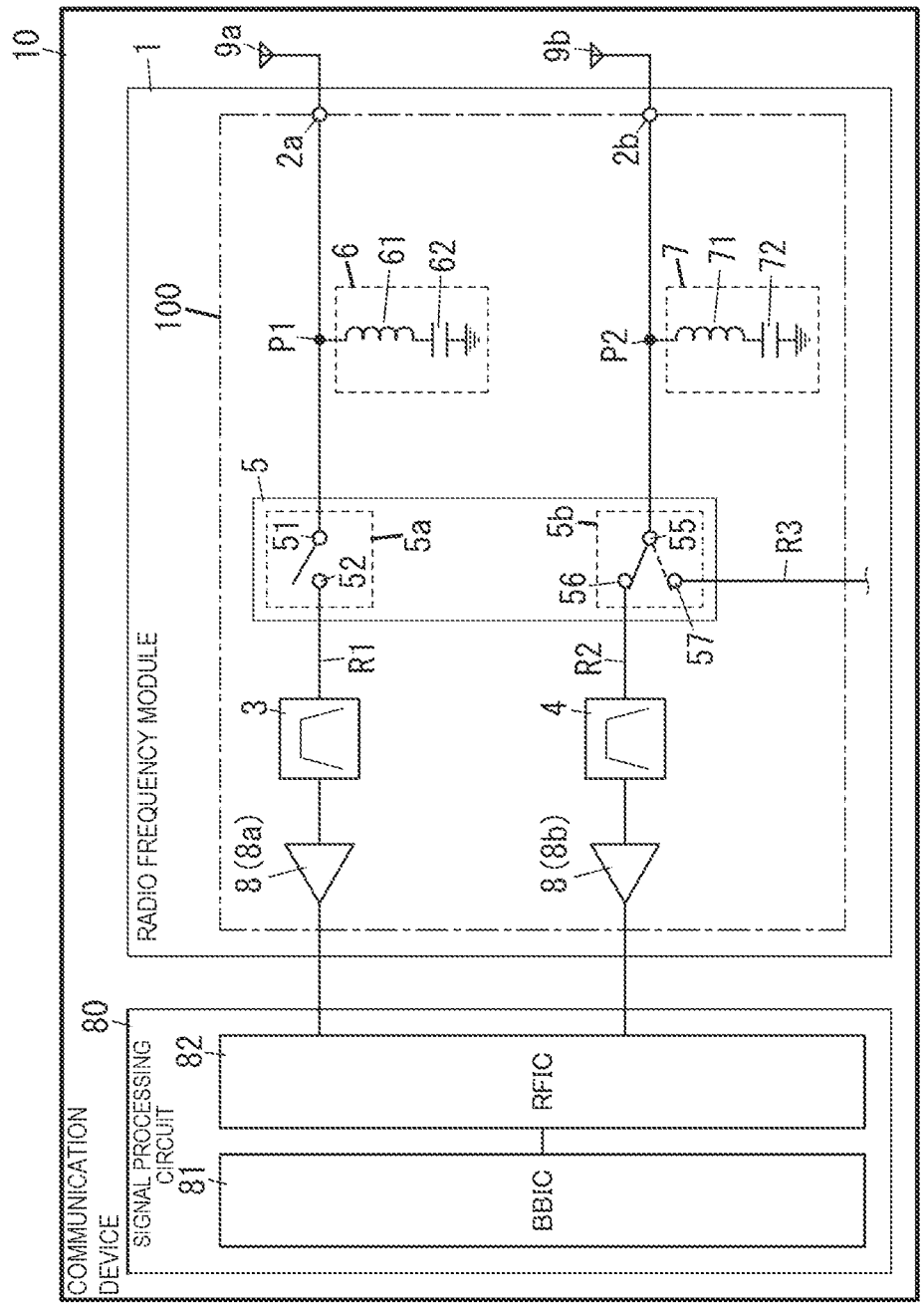
FIG. 1 is a circuit diagram for explaining a circuit configuration of a radio frequency module and a communication device according to Embodiment 1.

FIG. 1 to FIG. 11 referred to in the following embodiments or the like are all schematic views, and ratios of sizes and thicknesses of constituents in the drawings do not necessarily reflect actual dimensional ratios.

Embodiment 1

Hereinafter, a radio frequency module 1 and a communication device 10 including the radio frequency module 1 according to Embodiment 1 will be described with reference to FIG. 1 to FIG. 2.

(1) Radio Frequency Module

Figure 2:
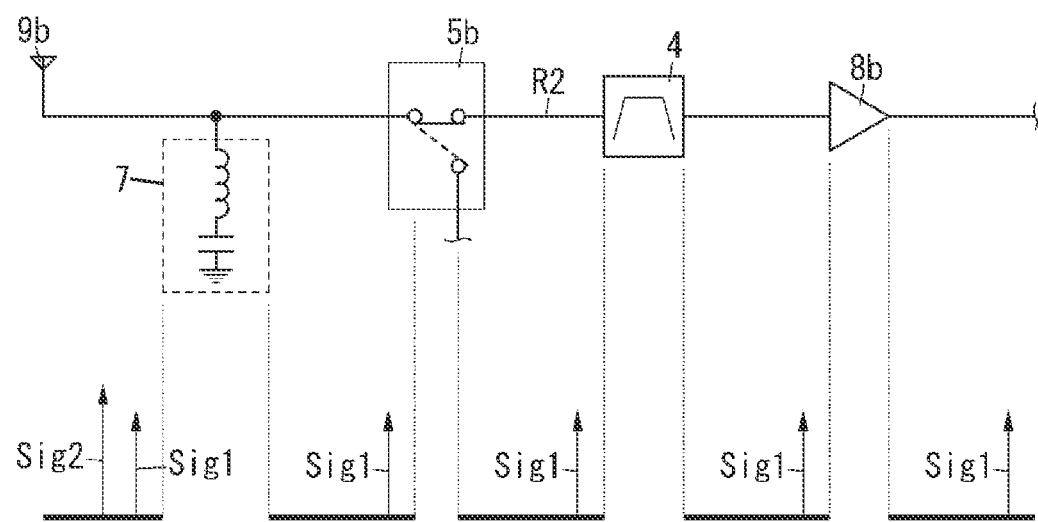
FIG. 2 is a diagram for explaining an operation example of the radio frequency module above during operation.

The radio frequency module 1 according to Embodiment 1 includes a reception module 100 as illustrated in FIG. 1. The radio frequency module 1 further includes a transmission module (not illustrated).

The radio frequency module 1 (reception module 100 thereof) includes a first antenna terminal 2a, a second antenna terminal 2b, a first reception filter 3, a second reception filter 4 (reception filter), a switch 5, a first filter 6, and a second filter 7 (filter). The radio frequency module 1 (reception module 100 thereof) includes a first low-noise amplifier 8a and a second low-noise amplifier 8b as amplifiers 8 to amplify signals.

The radio frequency module 1 is a module capable of supporting carrier aggregation (Carrier Aggregation) and dual connectivity (Dual Connectivity). In Embodiment 1, the radio frequency module 1 supports simultaneous use of a time division duplex (TDD) signal and a frequency division duplex (FDD) signal. Here, Carrier Aggregation and Dual Connectivity refer to communication that simultaneously uses radio waves of multiple frequency bands. Hereinafter, communication by Carrier Aggregation or Dual Connectivity is also referred to as simultaneous communication.

The radio frequency module 1 is used in a mobile phone such as a smartphone, for example. Note that the radio frequency module 1 may be used in a wearable terminal such as a smart watch, for example, not limited in a mobile phone. In short, the radio frequency module 1 is used in the communication device 10 to communicate with an external device (not illustrated) as illustrated in FIG. 1.

(2) Constituents of Radio Frequency Module

Hereinafter, constituents of the radio frequency module 1 according to Embodiment 1 will be described with reference to the drawings.

The first antenna terminal 2a is electrically connected to an antenna 9a as illustrated in FIG. 1. The second antenna terminal 2b is electrically connected to an antenna 9b as illustrated in FIG. 1.

The first reception filter 3 is provided in a first reception path R1 for receiving a first reception signal in a first communication band used in FDD communication from the antenna 9b by FDD, as illustrated in FIG. 1. Here, the first reception path R1 is a path for receiving a first reception signal by FDD through the first antenna terminal 2a. The first reception filter 3 is provided at a subsequent stage of the switch 5 and passes a reception signal in a predetermined frequency band (here, first reception signal in first communication band).

Specifically, the first reception filter 3 is provided at a subsequent stage of a first switch 5a, which will be described later and passes a reception signal in a predetermined frequency band. In Embodiment 1, the first reception filter 3 passes a first reception signal in the first communication band received by the antenna 9a during FDD communication. Here, the first communication band is Band3 (transmission band of 1710 MHz to 1785 MHz, reception band of 1805 MHz to 1880 MHz) of the Long Term Evolution (LTE) standard (including the LTE-Advanced standard), for example. Further, the "subsequent stage" of a constituent such as a switch refers to a side opposite to the antenna terminals (first antenna terminal 2a and second antenna terminal 2b) with respect to the constituent.

The second reception filter 4 is provided in a second reception path R2 (reception path) for receiving a second reception signal in a second communication band used in TDD communication from the antenna 9b by TDD, as illustrated in FIG. 1. Here, the second reception path R2 is a path for receiving a second reception signal by TDD through the second antenna terminal 2b. The second reception filter 4 is provided at a subsequent stage of the switch 5 and passes a reception signal in a predetermined frequency band (here, second reception signal in second communication band). Specifically, the second reception filter 4 is provided at a subsequent stage of a second switch 5b, which will be described later, and passes a reception signal in a predetermined frequency band. In Embodiment 1, the second reception filter 4 passes a second reception signal in the second communication band received by the antenna 9b during TDD communication. The second communication band is n77 (frequency band of 3300 MHz to 4200 MHz) determined by the 5G standard, for example. That is, the Band3 transmission band (1710 MHz to 1785 MHz) is included in a band (1650 MHz to 2100 MHz) of ½ of the n77 frequency band. Here, the band (second frequency band) of ½ of the frequency band (first frequency band) is a range in which ½ of the lower limit value of the first band is defined as the lower limit value of the second band, and ½ of the upper limit value of the first band is defined as the upper limit value of the second band. That is, the second frequency band includes a frequency of half the frequency of a reception signal in the first frequency band.

The switch 5 includes the first switch 5a and the second switch 5b as illustrated in FIG. 1.

The first switch 5a includes a common terminal 51 and a selection terminal 52. The selection terminal 52 is electrically connected to the first reception filter 3. The first switch 5a selects the selection terminal 52 as a connection destination of the common terminal 51. The first switch 5a connects the selection terminal 52 and the common terminal 51 during FDD communication under the control of a signal processing circuit 80, for example.

The common terminal 51 is connected to the first antenna terminal 2a. That is, the common terminal 51 is electrically connected to the antenna 9a through the first antenna terminal 2a.

The second switch 5b changes over between a transmission path R3 for a transmission signal and the second reception path R2 for a reception signal in TDD communication. That is, the second switch 5b is a switch for TDD. The second switch 5b includes a common terminal 55 and multiple (two in illustrated example) selection terminals 56 and 57. The selection terminal 56 is electrically connected to the second reception filter 4. The selection terminal 57 is electrically connected to a transmission filter (not illustrated) used during TDD communication. The transmission filter used during TDD communication passes a transmission signal in the second communication band for transmitting from the antenna 9b during TDD communication. Further, in the transmission path R3 and the second reception path R2, the path from the second switch 5b to the antenna 9b is common.

During TDD communication, the second switch 5b changes over the selection terminal 56 and the selection terminal 57 as a connection destination of the common terminal 55. During TDD communication, the second switch 5b changes over the connection destination of the common terminal 55 as follows under the control of the signal processing circuit 80, for example. The selection terminal 56 is a connection destination in a signal reception time period (reception time period), and the selection terminal 57 is a connection destination in a signal transmission time period (transmission time period). More specifically, the second switch 5b connects the antenna 9b and the second reception filter 4 in a reception time period. With this, in a reception time period, an n77 signal may be received. In a transmission time period, the second switch 5b disconnects the antenna 9b and the second reception filter 4, and connects a transmission filter (not illustrated) used during TDD communication and the antenna 9b. With this, in a transmission time period, an n77 signal may be transmitted.

The common terminal 55 is connected to the second antenna terminal 2b. That is, the common terminal 55 is electrically connected to the antenna 9b through the second antenna terminal 2b.

When simultaneous communication is performed, the antenna 9a and the first reception filter 3 are continuously electrically connected by the first switch 5a, and a connection destination of the antenna 9b is periodically changed over by the second switch 5b.

The first filter 6 is provided at a preceding stage of the first switch 5a in the first reception path R1. The first filter 6 is a notch filter, for example. The first filter 6 includes an inductor 61 and a capacitor 62. One end of the inductor 61 is connected to a point P1 between the first switch 5a and the first antenna terminal 2a, and on the first reception path R1. The other end of the inductor 61 is connected to one end of the capacitor 62. The other end of the capacitor 62 is connected to a ground. The first filter 6 attenuates a signal of a frequency belonging to a band of ½ of the Band3 reception band. Here, the "preceding stage" of a constituent such as a switch refers to a side of the antenna terminals (first antenna terminal 2a and second antenna terminal 2b) with respect to the constituent.

The second filter 7 is provided at a preceding stage of the second switch 5b in the second reception path R2. The second filter 7 is a notch filter, for example. The second filter 7 includes an inductor 71 and a capacitor 72. One end of the inductor 71 is connected to a point P2 between the second switch 5b and the second antenna terminal 2b, and on the second reception path R2. The other end of the inductor 71 is connected to one end of the capacitor 72. The other end of the capacitor 72 is connected to the ground. The second filter 7 attenuates a signal of a frequency belonging to a band of ½ of the n77 frequency band. That is, the second filter 7 attenuates a signal in a Band3 transmission band.

The first low-noise amplifier 8a amplifies a signal (here, first reception signal) that has passed through the first reception filter 3. More specifically, the first low-noise amplifier 8a amplifies a first reception signal (Band3 signal) received by the antenna 9a and having passed through the first reception filter 3. An input terminal of the first low-noise amplifier 8a is connected to the first reception filter 3.

An output terminal of the first low-noise amplifier 8a is connected to the signal processing circuit 80.

The second low-noise amplifier 8b amplifies a signal (here, second reception signal) that has passed through the second reception filter 4. More specifically, the second low-noise amplifier 8b amplifies a second reception signal (n77 signal) received by the antenna 9b and having passed through the second reception filter 4. An input terminal of the second low-noise amplifier 8b is connected to the second reception filter 4. An output terminal of the second low-noise amplifier 8b is connected to the signal processing circuit 80.

(3) Communication Device

The communication device 10 according to Embodiment 1 includes the radio frequency module 1, the signal processing circuit 80, and the antennas 9a and 9b as illustrated in FIG. 1. The signal processing circuit 80 processes a signal passing through the radio frequency module 1. The signal processing circuit 80 includes a baseband signal processing circuit 81 and an RF signal processing circuit 82.

The baseband signal processing circuit 81 is a Baseband Integrated Circuit (BBIC), for example, and is electrically connected to the RF signal processing circuit 82 as illustrated in FIG. 1. The baseband signal processing circuit 81 generates an I-phase signal and a Q-phase signal from a baseband signal. The baseband signal processing circuit 81 processes an IQ modulation by combining the I-phase signal and the Q-phase signal, and outputs a transmission signal. At this time, the transmission signal is generated as a modulated signal obtained by amplitude modulation of a carrier signal in a predetermined frequency with a period longer than the period of the carrier signal.

The RF signal processing circuit 82 is a Radio Frequency Integrated Circuit (RFIC), for example, and is provided between the radio frequency module 1 and the baseband signal processing circuit 81 as illustrated in FIG. 1. The RF signal processing circuit 82 has a function of processing a transmission signal outputted from the baseband signal processing circuit 81 and a function of processing a reception signal received by an antenna 9. The RF signal processing circuit 82 is a multiband processing circuit, and is able to generate and amplify a transmission signal of multiple communication bands.

Note that, in the communication device 10, the baseband signal processing circuit 81 is an optional component.

(4) Operation Example of Radio Frequency Module

Hereinafter, an operation of the radio frequency module 1 when the simultaneous communication is performed will be described with reference to FIG. 1.

In the case above, the first switch 5a makes the antenna 9a and the first reception filter 3 in a connected state. The second switch 5b selects either of the selection terminal 56 and the selection terminal 57 as the connection destination of the common terminal 55. The first reception filter 3 is continuously connected to the antenna 9a, and the second reception filter 4 and the transmission filter (not illustrated) used in TDD are alternately connected to the antenna 9b.

A first reception signal of FDD received by the antenna 9a is outputted to the RF signal processing circuit 82 through the first reception filter 3 in the first reception path R1.

An FDD transmission signal is outputted to an antenna (not illustrated) for transmitting an FDD signal through a path not illustrated. Upon receiving an FDD transmission signal, the antenna for transmitting an FDD signal outputs the FDD transmission signal.

A second reception signal of TDD received by the antenna 9b is outputted to the RF signal processing circuit 82 through the second reception filter 4 in the second reception path R2.

A TDD transmission signal is outputted to the antenna 9b through the transmission path R3 and the second antenna terminal 2b. Upon receiving a TDD transmission signal, the antenna 9b outputs the TDD transmission signal.

In Embodiment 1, an FDD transmission signal is a signal of a frequency included in the Band3 transmission band. Further, there is a case that the antenna 9b receives a Band3 signal transmitted from the antenna (not illustrated) for transmitting an FDD signal. That is, there is a case that the antenna 9b receives a second reception signal Sig 1 of an n77 signal, and an FDD signal Sig 2 (see FIG. 2).

In Embodiment 1, the second filter 7 attenuates a signal of a frequency belonging to a band of ½ of the n77 frequency band. Accordingly, the signal Sig 2 received by the antenna 9b is attenuated by the second filter 7. As a result, in the second reception path R2 of the subsequent stage of the second reception filter 4 or stages thereafter, it becomes possible to pass only the second reception signal Sig 1 as illustrated in FIG. 2.

(5) Effects

As described above, the radio frequency module 1 of Embodiment 1 includes a switch (second switch 5b, for example), a reception filter (second reception filter 4, for example), a low-noise amplifier (second low-noise amplifier 8b, for example), and a filter (second filter 7, for example). The switch changes over a transmission path of a transmission signal and a reception path of a reception signal (here, second reception signal) in communication based on a time division duplex system. The reception filter is provided at a subsequent stage of the switch and passes a reception signal in a predetermined frequency band (n77, for example). The low-noise amplifier amplifies a reception signal that has passed through the reception filter. The filter is provided at a preceding stage of the switch in a reception path (second reception path R2, for example).

With the configuration above, since a signal in an unnecessary band is attenuated by the filter, a harmonic wave of the signal in the unnecessary band due to the nonlinear characteristics of the switch is not generated. Accordingly, a decrease in reception sensitivity may further be suppressed.

Further, the filter attenuates a signal in a second frequency band that is lower than the first frequency band as a predetermined frequency band. Specifically, the second frequency band includes a frequency that is half the frequency of a reception signal in the first frequency band. With this, a second harmonic wave of a signal in an unnecessary band due to the nonlinear characteristics of the switch is not generated. Accordingly, by providing the filter, the generation of a second harmonic wave of a signal in an unnecessary band may be prevented. Thus, a decrease in reception sensitivity may further be suppressed.

(6) Modification

Hereinafter, modifications of Embodiment 1 will be described.

(6.1) Modification 1

Figure 3A:
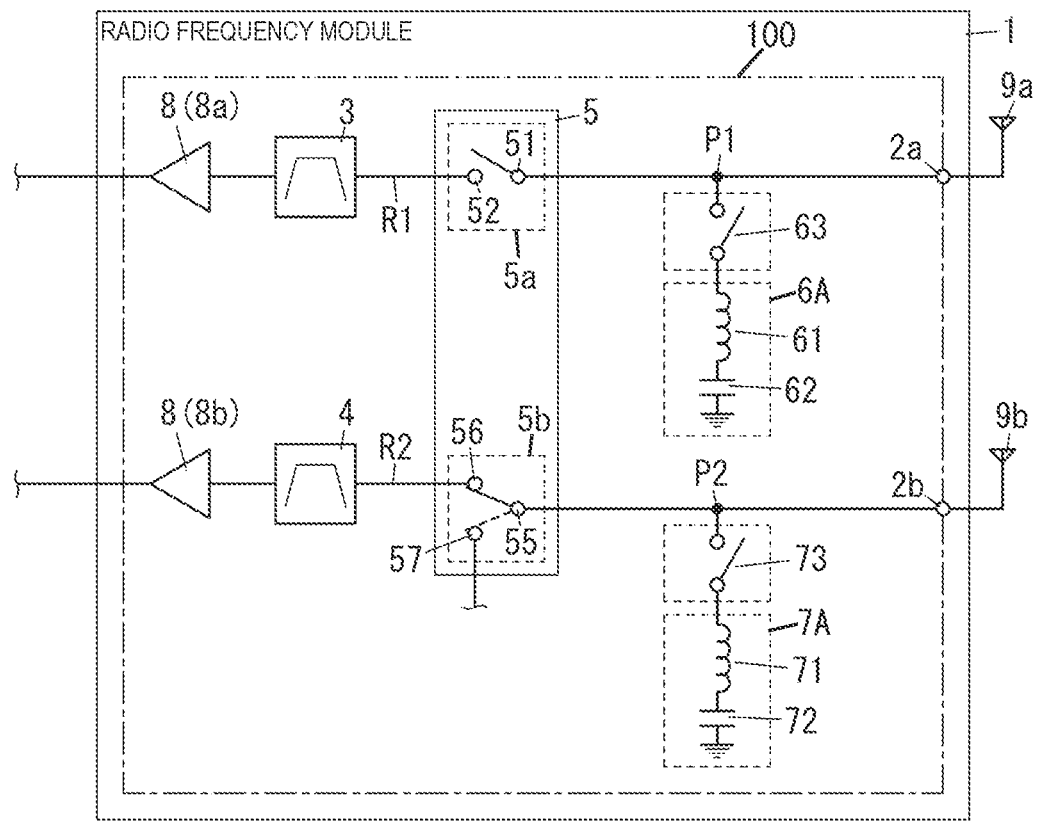
FIG. 3A is a diagram for explaining a circuit configuration of a radio frequency module according to Modification 1 of Embodiment 1.

The radio frequency module 1 (reception module 100 thereof) may include a first filter 6A, a second filter 7A, a first changeover switch 63, and a second changeover switch 73 illustrated in FIG. 3A, instead of the first filter 6 and the second filter 7.

Similar to the first filter 6, the first filter 6A is provided at a preceding stage of the first switch 5a in the first reception path R1. The first filter 6A is a notch filter, for example. Similar to the first filter 6 of Embodiment 1, the first filter 6A includes an inductor 61 and a capacitor 62.

One end of the first changeover switch 63 is connected to the point P1 between the first switch 5a and the first antenna terminal 2a, and on the first reception path R1. The other end of the first changeover switch 63 is connected to one end of the inductor 61. The other end of the inductor 61 is connected to one end of the capacitor 62. The other end of the capacitor 62 is connected to the ground. The first filter 6A attenuates a signal of a frequency belonging to a band of ½ of the Band3 reception band.

During FDD communication, the first changeover switch 63 electrically connects the first reception path R1 and the inductor 61. When the FDD communication is not performed, the first changeover switch 63 does not connect the first reception path R1 and the inductor 61. That is, the first changeover switch 63 changes over the connection and disconnection of the first filter 6A to and from the first reception path R1. In other words, the first changeover switch 63 changes over the connection and disconnection between the first filter 6A and the first reception path R1.

Similar to the second filter 7, the second filter 7A is provided at a preceding stage of the second switch 5b in the second reception path R2. The second filter 7A is a notch filter, for example. Similar to the second filter 7 of Embodiment 1, the second filter 7A includes an inductor 71 and a capacitor 72.

One end of the second changeover switch 73 is connected to the point P2 between the second switch 5b and the second antenna terminal 2b, and on the second reception path R2. The other end of the second changeover switch 73 is connected to one end of the inductor 71. The other end of the inductor 71 is connected to one end of the capacitor 72. The other end of the capacitor 72 is connected to the ground. The second filter 7A attenuates a signal of a frequency belonging to a band of ½ of the n77 frequency band.

During TDD communication, the second changeover switch 73 electrically connects the second reception path R2 and the inductor 71. When the TDD communication is not performed, the second changeover switch 73 does not connect the second reception path R2 and the inductor 71. That is, the second changeover switch 73 changes over the connection and disconnection between the second filter 7A and the second reception path R2.

(6.2) Modification 2

Figure 3B:
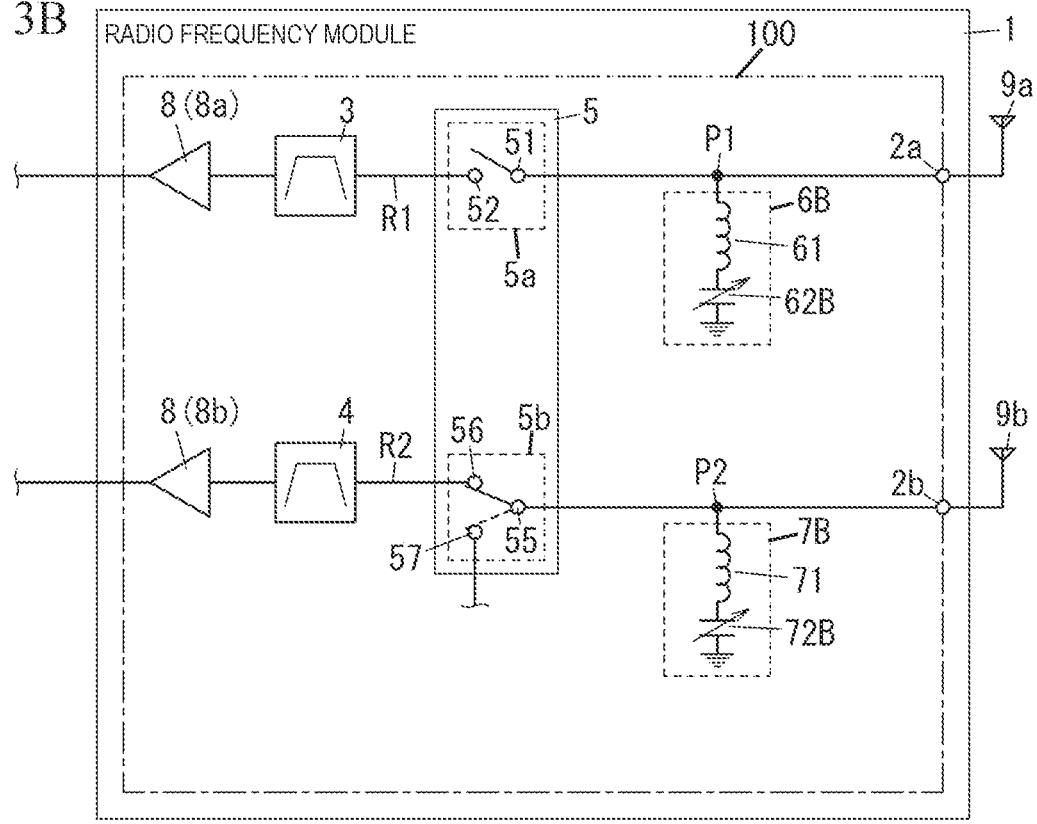
FIG. 3B is a diagram for explaining a circuit configuration of a radio frequency module according to Modification 2 of Embodiment 1.

The radio frequency module 1 (reception module 100 thereof) may include a first filter 6B and a second filter 7B illustrated in FIG. 3B, instead of the first filter 6 and the second filter 7.

Similar to the first filter 6, the first filter 6B is provided at a preceding stage of the first switch 5a in the first reception path R1. The first filter 6B is a notch filter, for example. The first filter 6B includes an inductor 61 and a capacitor 62B. One end of the inductor 61 is connected to the point P1 between the first switch 5a and the first antenna terminal 2a, and on the first reception path R1. The other end of the inductor 61 is connected to one end of the capacitor 62B. The other end of the capacitor 62B is connected to the ground. The capacitor 62B is a variable capacitor, and is configured such that the value of the capacitor 62B may be varied. That is, the first filter 6B is configured such that the frequency band of a signal to be attenuated is variable. The first filter 6B may change the band of a signal to be attenuated by varying the value of the capacitor 62B. In the present modification, the value of the capacitor 62B is set such that a signal of a frequency belonging to a band of ½ of the Band3 reception band is attenuated.

Similar to the second filter 7, the second filter 7B is provided at a preceding stage of the second switch 5b in the second reception path R2. The second filter 7B is a notch filter, for example. The second filter 7B includes an inductor 71 and a capacitor 72B. One end of the inductor 61 is connected to the point P2 between the second switch 5b and the second antenna terminal 2b, and on the second reception path R2. The other end of the inductor 71 is connected to one end of the capacitor 72B. The other end of the capacitor 72B is connected to the ground. The capacitor 72B is a variable capacitor, and is configured such that the value of the capacitor 72B may be varied. That is, the second filter 7D is configured such that the frequency band of a signal to be attenuated is variable. The second filter 7B may change the band of a signal to be attenuated by varying the value of the capacitor 72B. In the present modification, the value of the capacitor 72B is set such that a signal of a frequency belonging to a band of ½ of the n77 frequency band is attenuated.

With the configuration above, the band of a signal to be attenuated by the second filter 7B may be changed in accordance with the frequency band (transmission band) of the FDD communication performed at the same time as the TDD communication using n77 as the frequency band.

Note that, in this modification, the capacitor 62B and the capacitor 72B are variable capacitors, but are not limited thereto. The inductor 61 and the inductor 71 may be variable inductors. Alternatively, both the capacitors and the inductors may be made variable.

(6.3) Modification 3

Figure 4A:
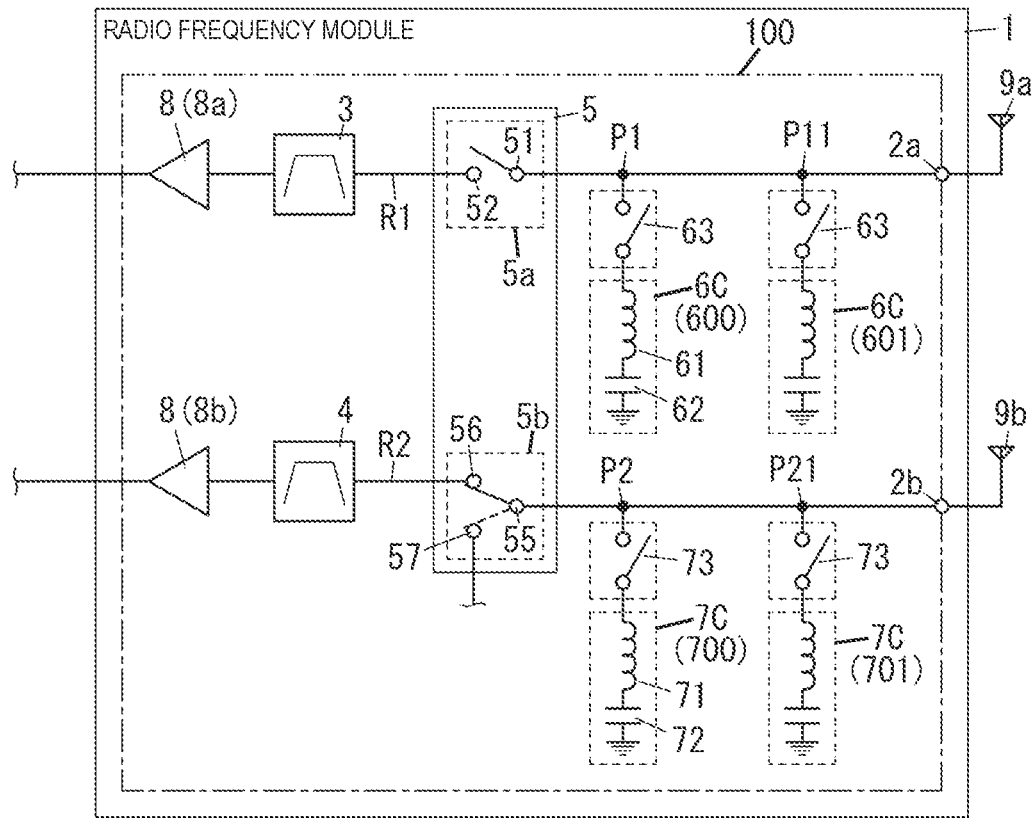
FIG. 4A is a diagram for explaining a circuit configuration of a radio frequency module according to Modification 3 of Embodiment 1.

The radio frequency module 1 (reception module 100 thereof) may include multiple sets of a first filter 6C and a first changeover switch 63 and multiple sets of a second filter 7C and a second changeover switch 73 (two pairs of each in illustrated example) instead of the first filter 6 and the second filter 7, as illustrated in FIG. 4A. Note that, when the multiple first filters 6C need to be distinguished from each other, they are denoted as first filters 601 and 602. Further, when the multiple second filters 7C need to be distinguished from each other, they are denoted as second filters 701 and 702.

Similar to the first filter 6, the multiple first filters 6C are provided at a preceding stage of the first switch 5a in the first reception path R1. The multiple first filters 6C are notch filters, for example. The multiple first filters 6C have constituents similar to those of the first filter 6 of Embodiment 1 and the first filter 6A of Modification 1. That is, each of the multiple first filters 6C includes an inductor 61 and a capacitor 62. The first changeover switch 63 is a switch for changing over the connection and disconnection between the first filter 6C and the first reception path R1.

One end of the first changeover switch 63 is connected to a path between the first switch 5a and the first antenna terminal 2a in the first reception path R1. The other end of the first changeover switch 63 is connected to one end of the inductor 61. The other end of the inductor 61 is connected to one end of the capacitor 62. The other end of the capacitor 62 is connected to the ground. In the present modification, one end of the first changeover switch 63 connected to the first filter 601 is connected to a point P1 between the first switch 5a and the first antenna terminal 2a, and on the first reception path R1. One end of the first changeover switch 63 connected to the first filter 602 is connected to a point P11 between the first switch 5a and the first antenna terminal 2a, and on the first reception path R1.

The multiple first filters 6C have different bands of signals to attenuate. In other words, the multiple first filters 6C attenuate signals in the bands different from each other. In the present modification, the first filter 601 of the multiple first filters 6C attenuates a signal of a frequency belonging to a band of ½ of the Band3 reception band.

Similar to the second filter 7, the multiple second filters 7C are provided at a preceding stage of the second switch 5b in the second reception path R2. The multiple second filters 7C are notch filters, for example. The multiple second filters 7C have constituents similar to those of the second filter 7 of Embodiment 1 and the second filter 7A of Modification 1. That is, each of the second filters 7C includes an inductor 71 and a capacitor 72. The second changeover switch 73 is a switch for changing over the connection and disconnection between the second filter 7C and the second reception path R2.

One end of the second changeover switch 73 is connected to a path between the second switch 5b and the second antenna terminal 2b in the second reception path R2. The other end of the second changeover switch 73 is connected to one end of the inductor 71. The other end of the inductor 71 is connected to one end of the capacitor 72. The other end of the capacitor 72 is connected to the ground. In the present modification, one end of the second changeover switch 73 connected to the second filter 701 is connected to a point P2 between the second switch 5b and the second antenna terminal 2b, and on the second reception path R2. One end of the second changeover switch 73 connected to the second filter 702 is connected to a point P21 between the second switch 5b and the second antenna terminal 2b, and on the second reception path R2.

The multiple second filters 7C have different bands of signals to attenuate. In other words, the multiple second filters 7C attenuate signals in the bands different from each other. In the present modification, the second filter 701 of the multiple second filters 7C attenuates a signal of a frequency belonging to a band of ½ of the Band3 reception band. The second filter 702 attenuates a signal of a frequency belonging to the transmission band of FDD used in simultaneous communication with n77.

(6.4) Modification 4

Figure 4B:
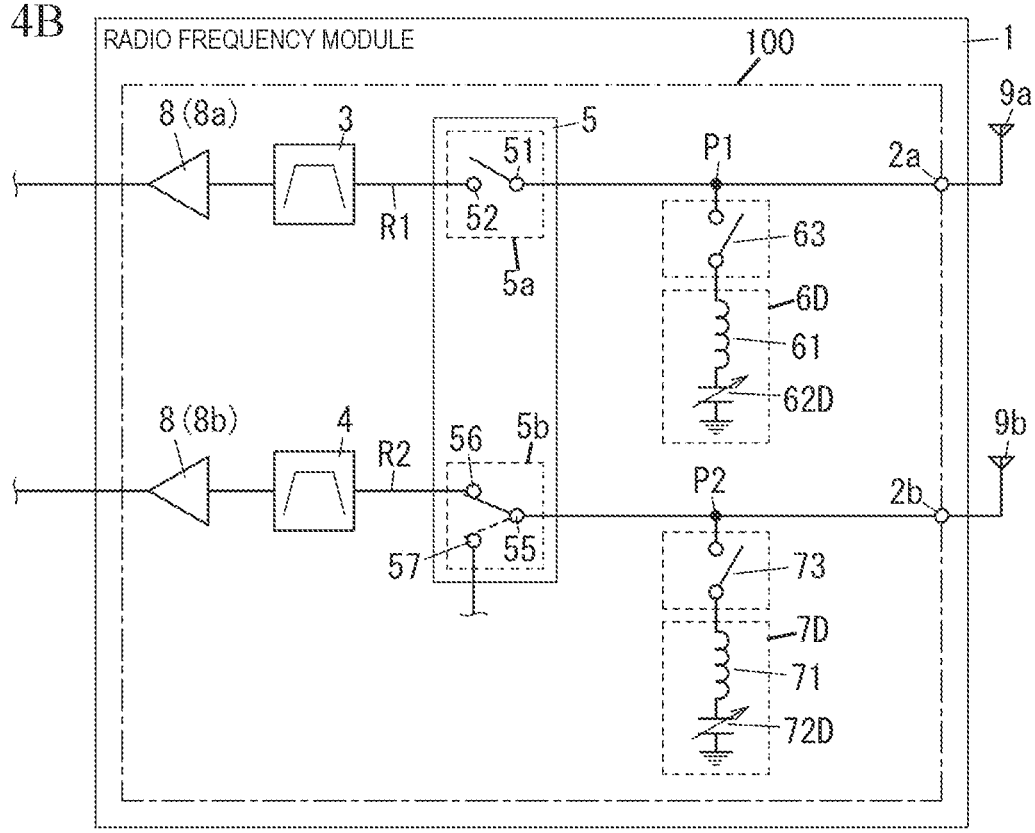
FIG. 4B is a diagram for explaining a circuit configuration of a radio frequency module according to Modification 4 of Embodiment 1.

The radio frequency module 1 (reception module 100 thereof) may include a first filter 6D, a second filter 7D, a first changeover switch 63, and a second changeover switch 73 illustrated in FIG. 4B, instead of the first filter 6 and the second filter 7.

Similar to the first filter 6, the first filter 6D is provided at a preceding stage of the first switch 5a in the first reception path R1. The first filter 6D is a notch filter, for example. The first filter 6D includes an inductor 61 and a capacitor 62D. The first changeover switch 63 is a switch for changing over the connection and disconnection between the first filter 6D and the first reception path R1. One end of the first changeover switch 63 is connected to the point P1 between the first switch 5a and the first antenna terminal 2a, and on the first reception path R1. The other end of the first changeover switch 63 is connected to one end of the inductor 61. The other end of the inductor 61 is connected to one end of the capacitor 62D. The other end of the capacitor 62D is connected to the ground. The capacitor 62D is a variable capacitor, and is configured such that the value of the capacitor 62D may be varied. That is, the first filter 6D is configured such that the frequency band of a signal to be attenuated is variable. The first filter 6D may change the band of a signal to be attenuated by varying the value of the capacitor 62D. In the present modification, the value of the capacitor 62D is set such that a signal of a frequency belonging to a band of ½ of the Band3 reception band is attenuated.

Similar to the second filter 7, the second filter 7D is provided at a preceding stage of the second switch 5b in the second reception path R2. The second filter 7D is a notch filter, for example. The second filter 7D includes an inductor 71 and a capacitor 72D. The second changeover switch 73 is a switch for changing over the connection and disconnection between the second filter 7D and the second reception path R2. One end of the second changeover switch 73 is connected to the point P2 between the second switch 5b and the second antenna terminal 2b, and on the second reception path R2. The other end of the second changeover switch 73 is connected to one end of the inductor 71. The other end of the inductor 71 is connected to one end of the capacitor 72D. The other end of the capacitor 72D is connected to the ground. The capacitor 72D is a variable capacitor, and is configured such that the value of the capacitor 72D may be varied. That is, the second filter 7D is configured such that the frequency band of a signal to be attenuated is variable. The second filter 7D may change the band of a signal to be attenuated by varying the value of the capacitor 72D. In the present modification, the value of the capacitor 72D is set such that a signal of a frequency belonging to a band of ½ of the n77 frequency band is attenuated.

Note that, in the present modification, the capacitor 62D and the capacitor 72D are variable capacitors, but are not limited thereto. The inductor 61 and the inductor 71 may be variable inductors. Alternatively, both the capacitors and the inductors may be made variable.

Further, the first filter 6D and the second filter 7D of the present modification may be applied to Modification 3. That is, to the radio frequency module 1 (reception module 100 thereof) of Modification 3, the first filter 6D may be applied instead of the first filter 6C of Modification 3, and the second filter 7D may be applied instead of the second filter 7C of Modification 3, respectively.

(6.5) Modification 5

In Embodiment 1 described above, the radio frequency module 1 is configured to include the reception module 100, but is not limited to the configuration. The radio frequency module 1 may include a transmission/reception module 100E instead of the reception module 100 (see FIG. 5).

The radio frequency module 1 (transmission/reception module 100E thereof) of the present modification includes the first antenna terminal 2a, the second antenna terminal 2b, the first reception filter 3, the second reception filter 4, a first transmission filter 3E, a second transmission filter 4E, the switch 5, the first filter 6, and the second filter 7. The radio frequency module 1 (transmission/reception module 100E thereof) includes the first low-noise amplifier 8a, the second low-noise amplifier 8b, a first power amplifier 8d, and a second power amplifier 8c as amplifiers 8 that amplify signals. Further, the communication device 10 of the present modification includes the radio frequency module 1 including the transmission/reception module 100E of the present modification, the signal processing circuit 80, and the antennas 9a and 9b.

Since the first antenna terminal 2a, the second antenna terminal 2b, the first reception filter 3, the second reception filter 4, the switch 5, the first filter 6, the second filter 7, the first low-noise amplifier 8a, and the second low-noise amplifier 8b have already been described in Embodiment 1, a description thereof will be omitted here. Further, since the signal processing circuit 80 has already been described in Embodiment 1, a description thereof will be omitted here.

Figure 5:
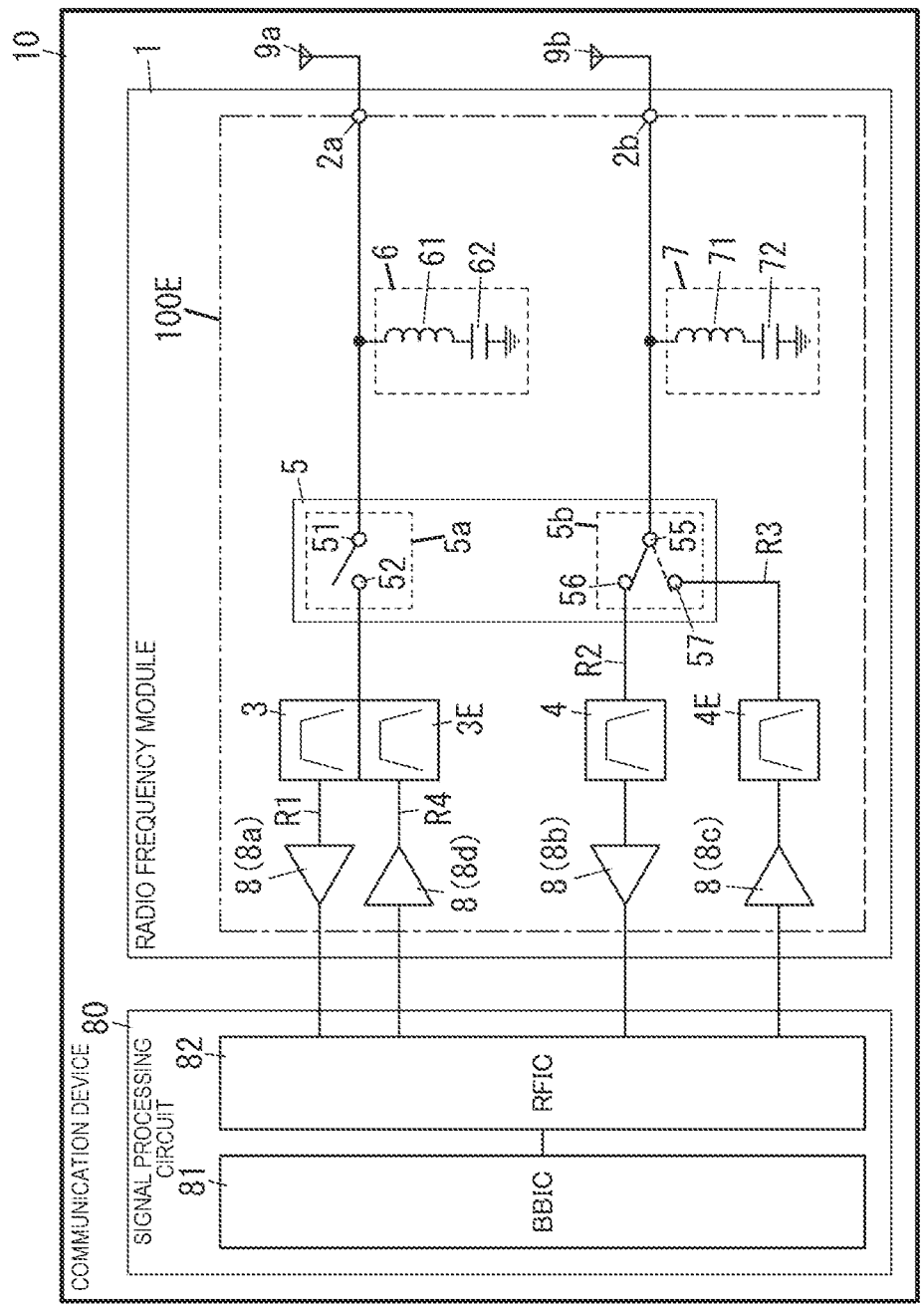
FIG. 5 is a diagram for explaining a circuit configuration of a radio frequency module and a communication device according to Modification 5 of Embodiment 1.

The first transmission filter 3E is provided in a transmission path R4 for transmitting a transmission signal in the first communication band used in FDD communication from the antenna 9a by FDD, as illustrated in FIG. 5. Here, the transmission path R4 is a path for transmitting a transmission signal by TDD through the first antenna terminal 2a. The first transmission filter 3E is provided at a subsequent stage of the switch 5 and passes a transmission signal in a predetermined frequency band (here, transmission signal in first communication band). Specifically, the first transmission filter 3E is provided at a subsequent stage of the first switch 5a and passes a transmission signal in a predetermined frequency band. The first transmission filter 3E passes a transmission signal accepted from the baseband signal processing circuit 81 of the signal processing circuit 80 during FDD communication. Here, similar to Embodiment 1, the first communication band is Band3 (transmission band of 1710 MHz to 1785 MHz, reception band of 1805 MHz to 1880 MHz) of the LTE standard (including the LTE-Advanced standard), for example.

The second transmission filter 4E is provided in a transmission path R3 for transmitting a transmission signal of the second communication band used in TDD communication from the antenna 9b by TDD, as illustrated in FIG. 5. Here, the transmission path R3 is a path for transmitting a transmission signal by TDD through the second antenna terminal 2b. The second transmission filter 4E is provided at a subsequent stage of the switch 5 and passes a transmission signal in a predetermined frequency band (here, transmission signal in second communication band). Specifically, the second transmission filter 4E is provided at a subsequent stage of the second switch 5b and passes a transmission signal in a predetermined frequency band. The second transmission filter 4E passes a transmission signal accepted from the baseband signal processing circuit 81 of the signal processing circuit 80 during TDD communication. Here, similar to Embodiment 1, the second communication band is n77 (frequency band of 3300 MHz to 4200 MHz) determined by the 5G standard, for example.

The first power amplifier 8d amplifies a transmission signal (Band3 transmission signal) accepted from the baseband signal processing circuit 81. The input terminal of the first power amplifier 8d is connected to the signal processing circuit 80 (the baseband signal processing circuit 81 thereof). The output terminal of the first power amplifier 8d is connected to the first transmission filter 3E.

The second power amplifier 8c amplifies a transmission signal (n77 transmission signal) accepted from the baseband signal processing circuit 81. The input terminal of the second power amplifier 8c is connected to the signal processing circuit 80 (the baseband signal processing circuit 81 thereof). The output terminal of the second power amplifier 8c is connected to the second transmission filter 4E.

The FDD transmission signal is a signal of a frequency included in the Band3 transmission band. Further, also in Modification 5, there is a case that the antenna 9b receives a Band3 signal transmitted from the antenna 9a for transmitting an FDD signal. However, similar to Embodiment 1, by providing the second filter 7, a decrease in reception sensitivity may further be suppressed.

Note that, in the radio frequency module 1 (transmission/reception module 100E thereof) of the present modification, the first filter and the second filter of Modification 1 to Modification 4 described above may be applied instead of the first filter 6 and the second filter 7 of the present modification.

(6.6) Modification 6

In Modification 5 described above, the second reception filter 4 and the second transmission filter 4E are configured as independent filters, but are not limited to the configuration. The second reception filter 4 and the second transmission filter 4E may be configured as a single filter.

Figure 6:
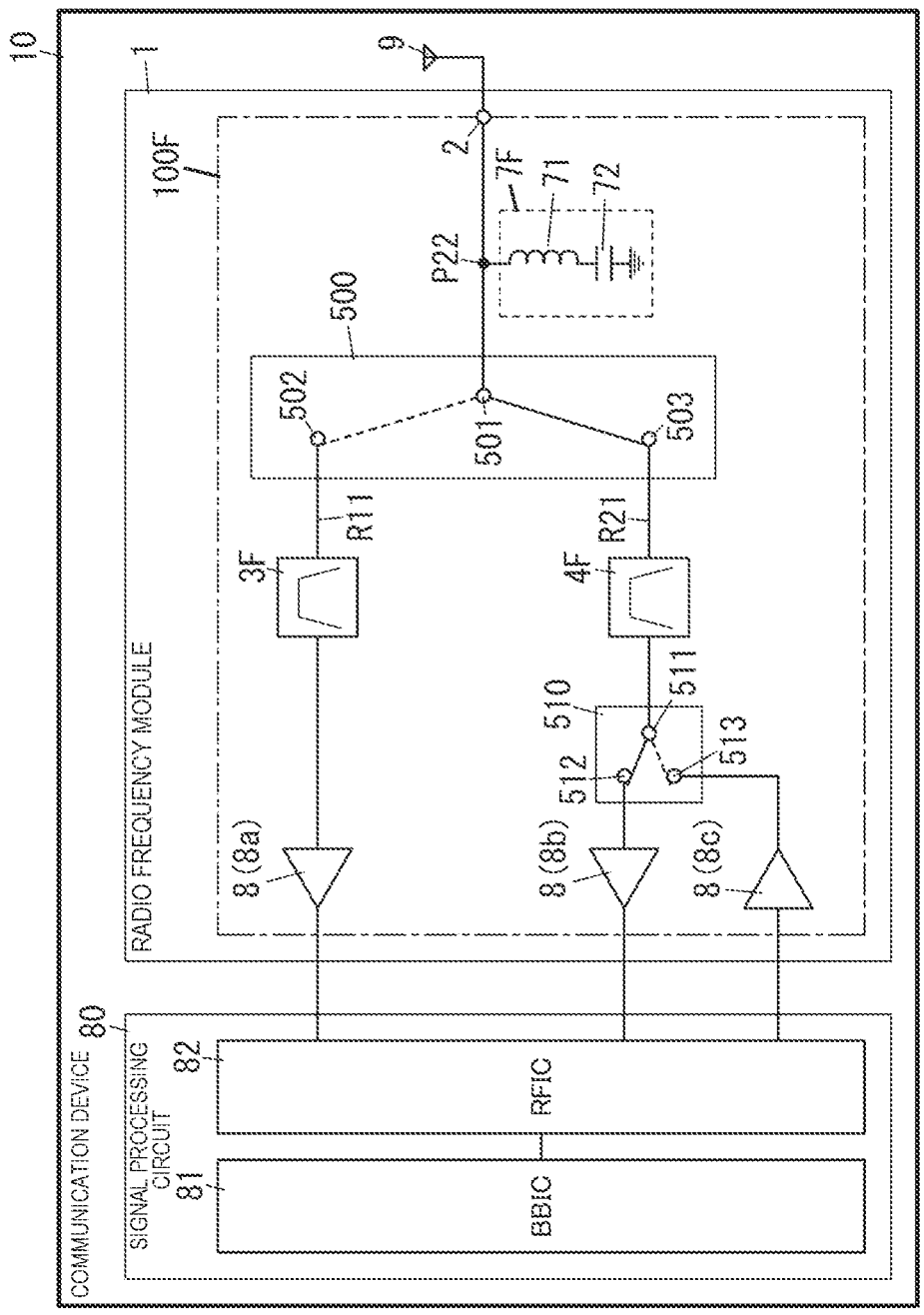
FIG. 6 is a diagram for explaining a circuit configuration of a radio frequency module and a communication device according to Modification 6 of Embodiment 1.

The radio frequency module 1 of the present modification includes a transmission/reception module 100F. The transmission/reception module 100F includes an antenna terminal 2, a reception filter 3F, a transmission/reception filter 4F, an antenna switch 500 (switch), a changeover switch 510, and a filter 7F, as illustrated in FIG. 6. The radio frequency module 1 (transmission/reception module 100F thereof) includes the first low-noise amplifier 8a, the second low-noise amplifier 8b, and the second power amplifier 8c (hereinafter, referred to as "power amplifier 8c" in Modification 6) as amplifiers 8 that amplify signals. Further, the communication device 10 of the present modification includes the radio frequency module 1 including the transmission/reception module 100F of the present modification, the signal processing circuit 80, and an antenna 9.

The antenna terminal 2 is electrically connected to the antenna 9 as illustrated in FIG. 6.

The reception filter 3F is provided in a third reception path R11 for receiving a third reception signal in a third communication band used in FDD communication from the antenna 9 by FDD, as illustrated in FIG. 1. Here, the third reception path R11 is a path for receiving a third reception signal by FDD through the antenna terminal 2. The reception filter 3F is provided at a subsequent stage of the antenna switch 500 and passes a reception signal in a predetermined frequency band (here, third reception signal in third communication band). In the present modification, the reception filter 3F passes a third reception signal in the third communication band received by the antenna 9a during FDD communication. Here, a third reception signal of the third communication band is a signal of a frequency band of the Long Term Evolution (LTE) standard (including the LTE-Advanced standard), which does not overlap with a band of ½ of the second communication band, for example.

As illustrated in FIG. 6, the transmission/reception filter 4F is provided on a path R21 for receiving a second reception signal in the second communication band used in TDD communication from the antenna 9b by TDD, and for transmitting a transmission signal in the second communication band from the antenna 9b by TDD. Here, the path R21 is a path for receiving a second reception signal by TDD through the antenna terminal 2, and for transmitting a transmission signal by TDD from the antenna terminal 2. The transmission/reception filter 4F is provided at a subsequent stage of the antenna switch 500 and passes a reception signal in a predetermined frequency band (here, second reception signal in second communication band) and a transmission signal in a predetermined frequency band (transmission signal in second communication band). In the present modification, the transmission/reception filter 4F passes the second reception signal in the second communication band received by the antenna 9 in a reception time period during TDD communication. The transmission/reception filter 4F passes a transmission signal of the second communication band outputted from the signal processing circuit 80 in a transmission time period during TDD communication. Similar to Embodiment 1, the second communication band is n77 (frequency band of 3300 MHz to 4200 MHz) determined by the 5G standard, for example.

The antenna switch 500 is a switch for changing over a connection destination of the antenna terminal 2 (that is, antenna 9). The antenna switch 500 has a common terminal 501 and multiple (two in illustrated example) selection terminals 502 and 503 as illustrated in FIG. 6. The antenna switch 500 selects at least one of the multiple selection terminals 502 and 503 as a connection destination of the common terminal 501. That is, the antenna switch 500 selectively connects the reception filter 3F or the transmission/reception filter 4F to the antenna 9. The common terminal 501 is connected to the antenna terminal 2. That is, the common terminal 501 is electrically connected to the antenna 9 through the antenna terminal 2. Note that the common terminal 501 is not limited to being directly connected to the antenna 9. A filter, a coupler, or the like may be provided between the common terminal 501 and the antenna 9. The selection terminal 502 is electrically connected to the reception filter 3F. The selection terminal 503 is electrically connected to the transmission/reception filter 4F. That is, the antenna switch 500 may simultaneously connect the antenna terminal 2, the reception filter 3F, and the transmission/reception filter 4F.

The changeover switch 510 changes over a transmission path of a transmission signal or a reception path of a reception signal (second reception signal) in TDD communication. That is, the changeover switch 510 is a switch for TDD. The changeover switch 510 includes a common terminal 511 and multiple (two in illustrated example) selection terminals 512 and 513. The common terminal 511 is electrically connected to the transmission/reception filter 4F. The selection terminal 512 is electrically connected to the second low-noise amplifier 8b. The selection terminal 513 is electrically connected to the power amplifier 8c. During TDD communication, the changeover switch 510 changes over the selection terminal 512 and the selection terminal 513 as a connection destination of the common terminal 511. During TDD communication, the changeover switch 510 changes over the connection destination of the common terminal 511 as follows under the control of the signal processing circuit 80, for example. The selection terminal 512 is a connection destination in the reception time period, and the selection terminal 513 is a connection destination in the transmission time period. More specifically, the changeover switch 510 connects the transmission/reception filter 4F and the second low-noise amplifier 8b in the reception time period. With this, in the reception time period, an n77 signal may be received. The changeover switch 510 connects the transmission/reception filter 4F and the power amplifier 8c in the transmission time period. With this, in the transmission time period, an n77 signal may be transmitted.

The filter 7F is provided at a preceding stage of the second switch 5b in the path R21. The filter 7F is a notch filter, for example. The filter 7F includes an inductor 71 and a capacitor 72. One end of the inductor 71 is connected to a point P22 between the antenna switch 500 and the antenna terminal 2, and on the path R21. The other end of the inductor 71 is connected to one end of the capacitor 72. The other end of the capacitor 72 is connected to the ground. The filter 7F attenuates a signal of a frequency belonging to a band of ½ of the n77 frequency band. That is, the filter 7F attenuates a signal in the Band3 transmission band.

The first low-noise amplifier 8a is different from the first low-noise amplifier 8a of Embodiment 1 only in a reception band of a signal to process, and the function of those are the same, so that a description thereof will be omitted here.

Since the second low-noise amplifier 8b is identical with the second low-noise amplifier 8b of Embodiment 1, a description thereof is omitted here.

The power amplifier 8c amplifies a signal (transmission signal) accepted from the signal processing circuit 80. The power amplifier 8c outputs the amplified transmission signal to the transmission/reception filter 4F through the changeover switch 510. An input terminal of the power amplifier 8c is connected to the signal processing circuit 80. An output terminal of the power amplifier 8c is connected to the transmission/reception filter 4F through the changeover switch 510.

Note that, since the configuration of the signal processing circuit 80 is similar to that in Embodiment 1, a description thereof is omitted here.

In the present modification, transmission and reception of the Band3 signal are performed by a module that is different from the transmission/reception module 100F. That is, the communication device 10 of the present modification may perform simultaneous communication using Band3 and n77. Accordingly, during simultaneous communication using Band3 and n77, there is a possibility that the antenna 9 receives a Band3 transmission signal.

Then, the radio frequency module 1 of the present modification includes a switch (antenna switch 500, for example), a transmission/reception filter (4F), a low-noise amplifier (second low-noise amplifier 8b, for example), and a filter (filter 7F, for example). The switch changes over a connection destination of the antenna (9). The transmission/reception filter (4F) is provided at a subsequent stage of the switch and passes a reception signal in a predetermined frequency band (here, second reception signal) and a transmission signal in a predetermined frequency band. The low-noise amplifier amplifies a reception signal that has passed through the transmission/reception filter (4F). The filter is provided at a preceding stage of the switch in the reception path (path R21, for example) of a reception signal.

With the configuration above, it is possible to reduce the possibility that a second harmonic wave of a Band3 transmission signal is inputted to the transmission/reception filter 4F. Accordingly, a decrease in reception sensitivity may further be suppressed.

Note that, in the radio frequency module 1 (transmission/reception module 100F thereof) of the present modification, the second filter of Modification 1 to Modification 4 described above may be applied instead of the filter 7F of the present modification.

(6.7) Modification 7

Embodiment 1 described above adopted a configuration in which different antennas are used for the communication in the first communication band (Band3) and the communication in the second communication band (n77), but is not limited to the configuration.

Figure 7:
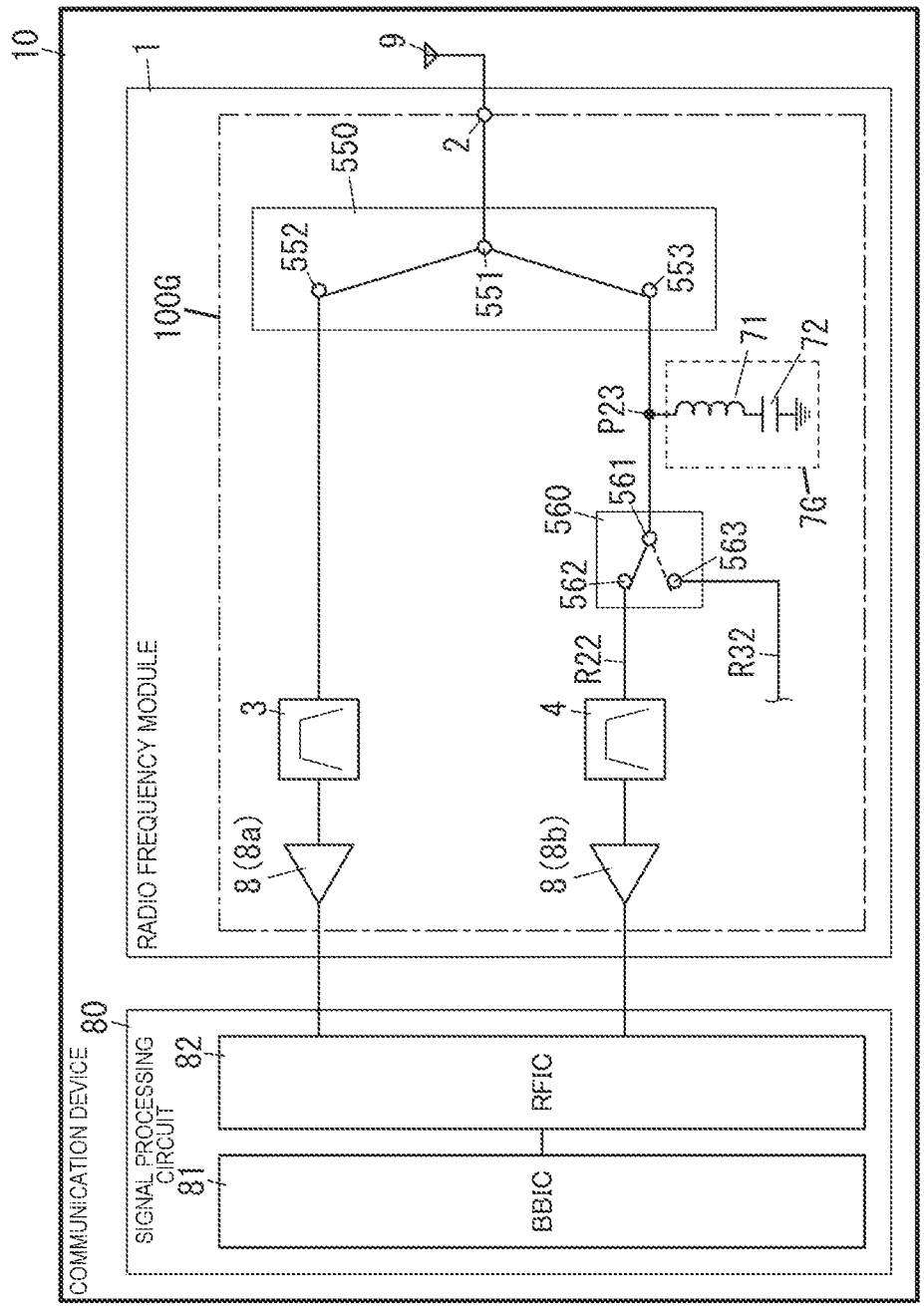
FIG. 7 is a diagram for explaining a circuit configuration of a radio frequency module and a communication device according to Modification 7 of Embodiment 1.

The same antenna may be used for the communication in the first communication band (Band3) and the communication in the second communication band (n77). In the case above, the radio frequency module 1 of the present modification includes a reception module 100G as illustrated in FIG. 7. The reception module 100G includes the antenna terminal 2, the first reception filter 3, the second reception filter 4, an antenna switch 550, a path changeover switch 560, and the filter 7F. The radio frequency module 1 (reception module 100G thereof) includes the first low-noise amplifier 8a and the second low-noise amplifier 8b as amplifiers 8 that amplify signals. Further, the communication device 10 of the present modification includes the radio frequency module 1 including the reception module 100G of the present modification, the signal processing circuit 80, and the antenna 9.

Since the first reception filter 3, the second reception filter 4, the first low-noise amplifier 8a, the second low-noise amplifier 8b, and the signal processing circuit 80 have already been described in Embodiment 1, a description thereof will be omitted here.

The antenna terminal 2 is electrically connected to the antenna 9 as illustrated in FIG. 7.

The antenna switch 550 is a switch for changing over the connection destination of the antenna terminal 2 (antenna 9). The antenna switch 550 has a common terminal 551 and multiple (two in illustrated example) selection terminals 552 and 553 as illustrated in FIG. 7. The antenna switch 550 selects at least one of the multiple selection terminals 552 and 553 as a connection destination of the common terminal 551. That is, the antenna switch 550 selectively connects the first reception filter 3 or the second reception filter 4 to the antenna 9. The common terminal 551 is connected to the antenna terminal 2. That is, the common terminal 551 is electrically connected to the antenna 9 through the antenna terminal 2. Note that the common terminal 551 is not limited to being directly connected to the antenna 9. A filter, a coupler, or the like may be provided between the common terminal 551 and the antenna 9. The selection terminal 552 is electrically connected to the first reception filter 3. The selection terminal 553 is electrically connected to the second reception filter 4. That is, the antenna switch 550 may simultaneously connect the antenna terminal 2, the first reception filter 3, and the second reception filter 4.

The path changeover switch 560 changes over a transmission path R32 of a transmission signal and a reception path R22 of a reception signal (second reception signal described above) in TDD communication. That is, the path changeover switch 560 is a switch for TDD. The path changeover switch 560 includes a common terminal 561 and multiple (two in illustrated example) selection terminals 562 and 563. The common terminal 561 is electrically connected to the selection terminal 553 of the antenna switch 550. The selection terminal 562 is electrically connected to the second reception filter 4. The selection terminal 563 is electrically connected to a transmission filter (not illustrated) used during TDD communication. Note that, in the transmission path R32 and the reception path R22, the path from the path changeover switch 560 to the antenna 9 is common. During TDD communication, the path changeover switch 560 changes over the selection terminal 562 and the selection terminal 563 as a connection destination of the common terminal 561. During TDD communication, the path changeover switch 560 changes over the connection destination of the common terminal 561 as follows under the control of the signal processing circuit 80, for example. The selection terminal 562 is a connection destination in the reception time period, and the selection terminal 563 is a connection destination in the transmission time period. More specifically, the changeover switch 510 connects the second reception filter 4 and the selection terminal 553 of the antenna switch 550 in the reception time period. With this, an n77 signal may be received in the reception time period. The path changeover switch 560 connects a transmission filter (not illustrated) used during TDD communication and the selection terminal 553 of the antenna switch 550 in the transmission time period. With this, an n77 signal may be transmitted in the transmission time period.

A filter 7G is provided at a preceding stage of the path changeover switch 560 in the reception path R22. The filter 7G is a notch filter, for example. The filter 7G includes an inductor 71 and a capacitor 72. One end of the inductor 71 is connected to a point P23 between the antenna switch 500 and the path changeover switch 560, and on the reception path R22. The other end of the inductor 71 is connected to one end of the capacitor 72. The other end of the capacitor 72 is connected to the ground. The filter 7G attenuates a signal of a frequency belonging to a band of ½ of the n77 frequency band. That is, the filter 7G attenuates a signal in the Band3 transmission band.

Note that, in the radio frequency module 1 (transmission/reception module 100F thereof) of the present modification, the second filter of Modification 1 to Modification 4 described above may be applied instead of the filter 7G of the present modification.

(6.8) Modification 8

In Embodiment 1 described above, the first filter 6 is configured to attenuate a signal of a frequency belonging to a band of ½ of the reception band of the first communication band (Band3), but is not limited to the configuration. The first filter 6 may be configured to attenuate a signal of a frequency belonging to a band lower than the reception band of the first communication band (Band3).

Similarly, the second filter 7 may be configured to attenuate a signal of a frequency belonging to a band lower than the frequency band of the second communication band (n77).

Further, the first filters described in Modification 1 to Modification 5 may similarly be configured to attenuate a signal of a frequency belonging to a band lower than the reception band of the first communication band (Band3). The second filters described in Modification 1 to Modification 5 may similarly be configured to attenuate a signal of a frequency belonging to a band lower than the frequency band of the second communication band (n77).

Further, the filters described in Modification 6 to Modification 7 may similarly be configured to attenuate a signal of a frequency belonging to a band lower than the frequency band of the second communication band (n77).

Embodiment 2

In Embodiment 2, the configurations of the first filter and the second filter are different from those in Embodiment 1. Hereinafter, differences from Embodiment 1 will mainly be described. Note that the same constituents as those of Embodiment 1 are denoted by the same reference signs, and a description thereof will be appropriately omitted.

(1) Configuration

Figure 8:
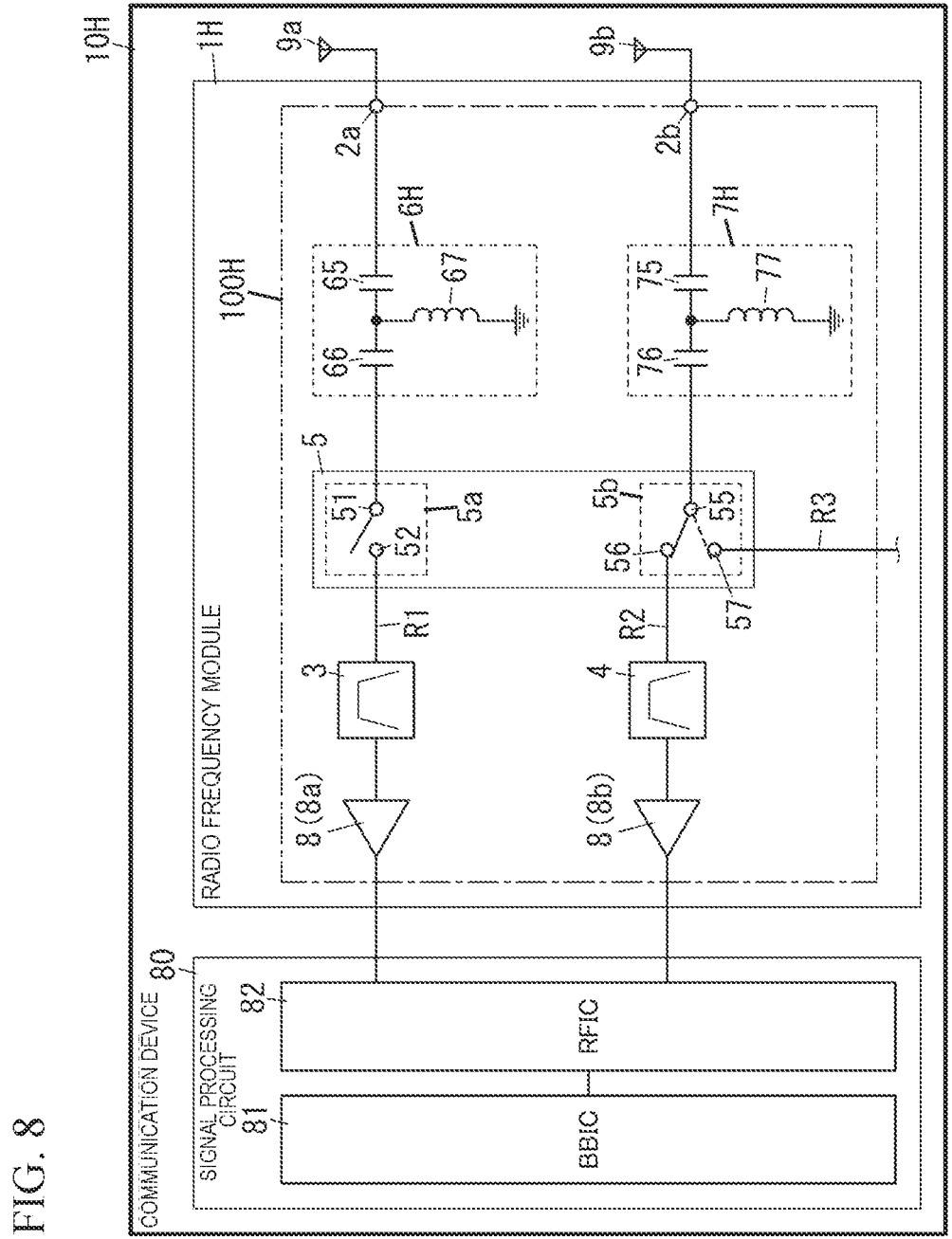
FIG. 8 is a circuit diagram for explaining a circuit configuration of a radio frequency module and a communication device according to Embodiment 2.

A communication device 10H of Embodiment 2 includes a signal processing circuit 80, a radio frequency module 1H, and antennas 9a and 9b as illustrated in FIG. 8. The radio frequency module 1H includes a reception module 100H. The radio frequency module 1H further includes a transmission module (not illustrated).

The radio frequency module 1H (reception module 100H thereof) includes a first antenna terminal 2a, a second antenna terminal 2b, a first reception filter 3, a second reception filter 4 (reception filter), a switch 5, a first filter 6H, and a second filter 7H (filter). The radio frequency module 1H (reception module 100H thereof) includes a first low-noise amplifier 8a and a second low-noise amplifier 8b as amplifiers 8 that amplify signals. Similar to Embodiment 1, the switch 5 includes a first switch 5a and a second switch 5b.

The first filter 6H is provided at a preceding stage of the first switch 5a in a first reception path R1. The first filter 6H is a high pass filter, for example. The first filter 6H includes a first capacitor 65, a second capacitor 66, and an inductor 67. The first capacitor 65 and the second capacitor 66 are connected in series between the first antenna terminal 2a and the first switch 5a, and on the first reception path R1. One end of the inductor 67 is connected between the first capacitor 65 and the second capacitor 66. The other end of the inductor 67 is connected to the ground. The first filter 6H attenuates a signal of a frequency belonging to a band of ½ of the Band3 reception band.

The second filter 7H is provided at a preceding stage of the second switch 5b in a second reception path R2. The second filter 7H is a high pass filter, for example. The second filter 7H includes a first capacitor 75, a second capacitor 76, and an inductor 77. The first capacitor 75 and the second capacitor 76 are connected in series between the second antenna terminal 2b and the second switch 5b, and on the second reception path R2. One end of the inductor 77 is connected between the first capacitor 75 and the second capacitor 76. The other end of the inductor 77 is connected to the ground. The second filter 7H attenuates a signal of a frequency belonging to a band of ½ of the n77 frequency band. That is, the second filter 7H attenuates a signal in the Band3 transmission band.

The radio frequency module 1H of Embodiment 2 includes a switch (second switch 5b, for example), a reception filter (second reception filter 4, for example), a low-noise amplifier (second low-noise amplifier 8b, for example), and a filter (second filter 7H, for example). The switch changes over a transmission path of a transmission signal and a reception path of a reception signal (here, second reception signal) in communication based on a time division duplex system. The reception filter is provided at a subsequent stage of the switch and passes a reception signal in a predetermined frequency band. The low-noise amplifier amplifies the reception signal that has passed through the reception filter. The filter is provided at a preceding stage of the switch in a reception path (second reception path R2, for example).

With the configuration above, since a signal in an unnecessary band is attenuated by the filter, a harmonic wave of the signal in the unnecessary band due to the nonlinear characteristics of the switch is not generated. Accordingly, a decrease in reception sensitivity may further be suppressed.

(2) Modification

Hereinafter, modifications of Embodiment 2 will be described.

(2.1) Modification 1

Figure 9A:
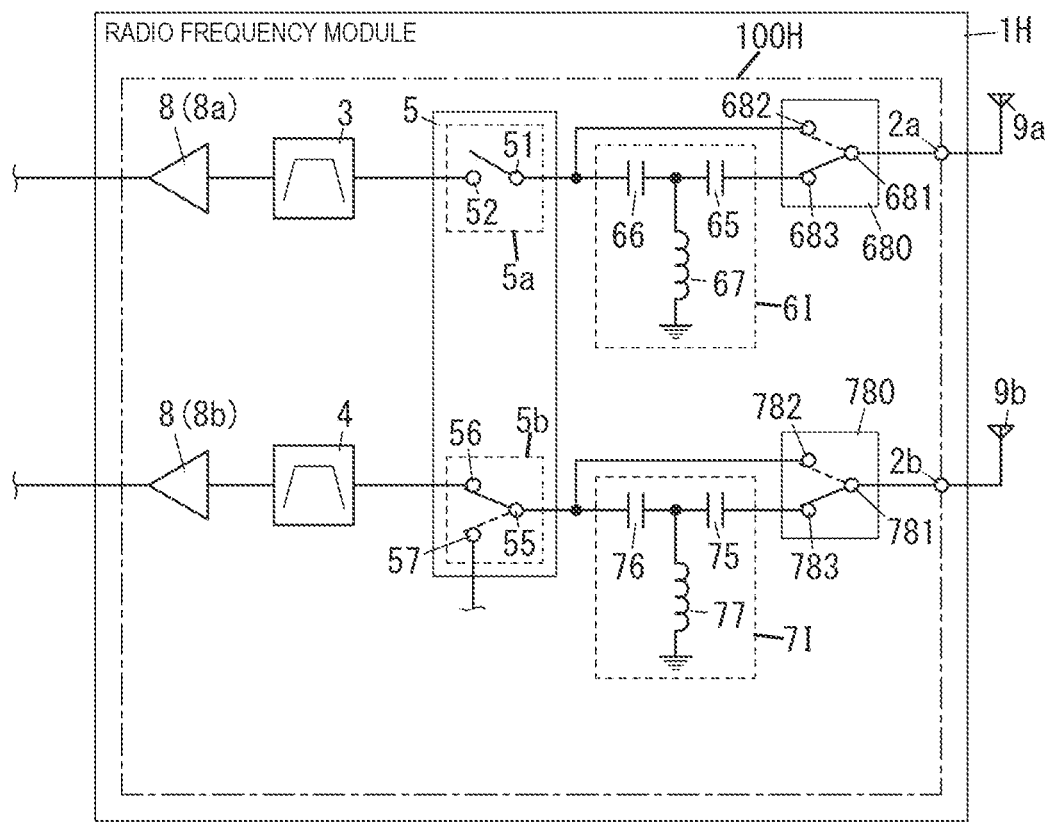
FIG. 9A is a diagram for explaining a circuit configuration of a radio frequency module according to Modification 1 of Embodiment 2.

The radio frequency module 1H (reception module 100H thereof) may include a first filter 6I, a second filter 7I, a first changeover switch 680, and a second changeover switch 780 illustrated in FIG. 9A instead of the first filter 6H and the second filter 7H.

Similar to the first filter 6H, the first filter 6I is provided at a preceding stage of the first switch 5a in the first reception path R1. The first filter 6I is a high pass filter, for example. Similar to the first filter 6H of Embodiment 2, the first filter 6I includes a first capacitor 65, a second capacitor 66, and an inductor 67. The first capacitor 65 and the second capacitor 66 are connected in series between the first antenna terminal 2a and the first switch 5a, and on the first reception path R1. One end of the inductor 67 is connected between the first capacitor 65 and the second capacitor 66. The other end of the inductor 67 is connected to the ground. The first filter 6I attenuates a signal of a frequency belonging to a band of ½ of the Band3 reception band.

The first changeover switch 680 is provided between the first capacitor 65 and the first switch 5a. The first changeover switch 680 has a common terminal 681 and multiple (two in illustrated example) selection terminals 682 and 683. The common terminal 681 is electrically connected to the first antenna terminal 2a. The selection terminal 682 is electrically connected to the common terminal 51 of the first switch 5a without necessarily through the first filter 6I. The selection terminal 683 is electrically connected to the first capacitor 65 of the first filter 6I.

The first changeover switch 680 selects at least one of the multiple selection terminals 682 and 683 as a connection destination of the common terminal 681. That is, the first changeover switch 680 changes over the paths from the first antenna terminal 2a to the first switch 5a. Note that the common terminal 681 is not limited to being directly connected to the antenna 9a. A filter, a coupler, or the like may be provided between the common terminal 681 and the antenna 9a.

When the common terminal 681 and the selection terminal 683 are connected in the first changeover switch 680, the Band3 reception signal (first reception signal) passes through the first filter 6I. Accordingly, when the common terminal 681 and the selection terminal 683 are connected, the first filter 6I is connected to the reception path of Band3. Meanwhile, when the common terminal 681 and the selection terminal 682 are connected in the first changeover switch 680, a Band3 reception signal (first reception signal) does not pass through the first filter 6I. Accordingly, when the common terminal 681 and the selection terminal 682 are connected, the first filter 6I is not connected to the reception path. That is, the first changeover switch 680 is a switch for changing over the connection and disconnection between the first filter 6I and the reception path of Band3.

Similar to the second filter 7H, the second filter 7I is provided at a preceding stage of the second switch 5b in the second reception path R2. The second filter 7I is a high pass filter, for example. Similar to the second filter 7H of Embodiment 2, the second filter 7I includes a first capacitor 75, a second capacitor 76, and an inductor 77. The first capacitor 75 and the second capacitor 76 are connected in series between the second antenna terminal 2b and the second switch 5b, and on the second reception path R2. One end of the inductor 77 is connected between the first capacitor 75 and the second capacitor 76. The other end of the inductor 77 is connected to the ground. The second filter 7I attenuates a signal of a frequency belonging to a band of ½ of the n77 frequency band. That is, the second filter 7I attenuates a signal in the Band3 transmission band.

The second changeover switch 780 is provided between the first capacitor 75 and the second switch 5b. The second changeover switch 780 has a common terminal 781 and multiple (two in illustrated example) selection terminals 782 and 783. The common terminal 781 is electrically connected to the second antenna terminal 2b. The selection terminal 782 is electrically connected to the common terminal 55 of the second switch 5b without necessarily through the second filter 7I. The selection terminal 783 is electrically connected to the first capacitor 75 of the second filter 7I.

The second changeover switch 780 selects at least one of the multiple selection terminals 782 and 783 as a connection destination of the common terminal 781. That is, the second changeover switch 780 changes over the paths from the second antenna terminal 2b to the second switch 5b. Note that the common terminal 781 is not limited to being directly connected to the antenna 9b. A filter, a coupler, or the like may be provided between the common terminal 781 and the antenna 9b.

When the common terminal 781 and the selection terminal 783 are connected in the second changeover switch 780, the n77 reception signal (second reception signal) passes through the second filter 7I. Accordingly, when the common terminal 781 and the selection terminal 783 are connected, the second filter 7I is connected to the reception path of n77. Meanwhile, when the common terminal 781 and the selection terminal 782 are connected in the second changeover switch 780, the n77 reception signal (second reception signal) does not pass through the second filter 7I. Accordingly, when the common terminal 781 and the selection terminal 782 are connected, the second filter 7I is not connected to the reception path. That is, the second changeover switch 780 is a switch for changing over the connection and disconnection between the second filter 7I and the reception path of n77.

When simultaneous communication of Band3 and n77 is performed, the first changeover switch 680 connects the first antenna terminal 2a and the first filter 6I. When simultaneous communication of Band3 and n77 is performed, the second changeover switch 780 connects the second antenna terminal 2b and the second filter 7I.

(2.2) Modification 2

Figure 9B:
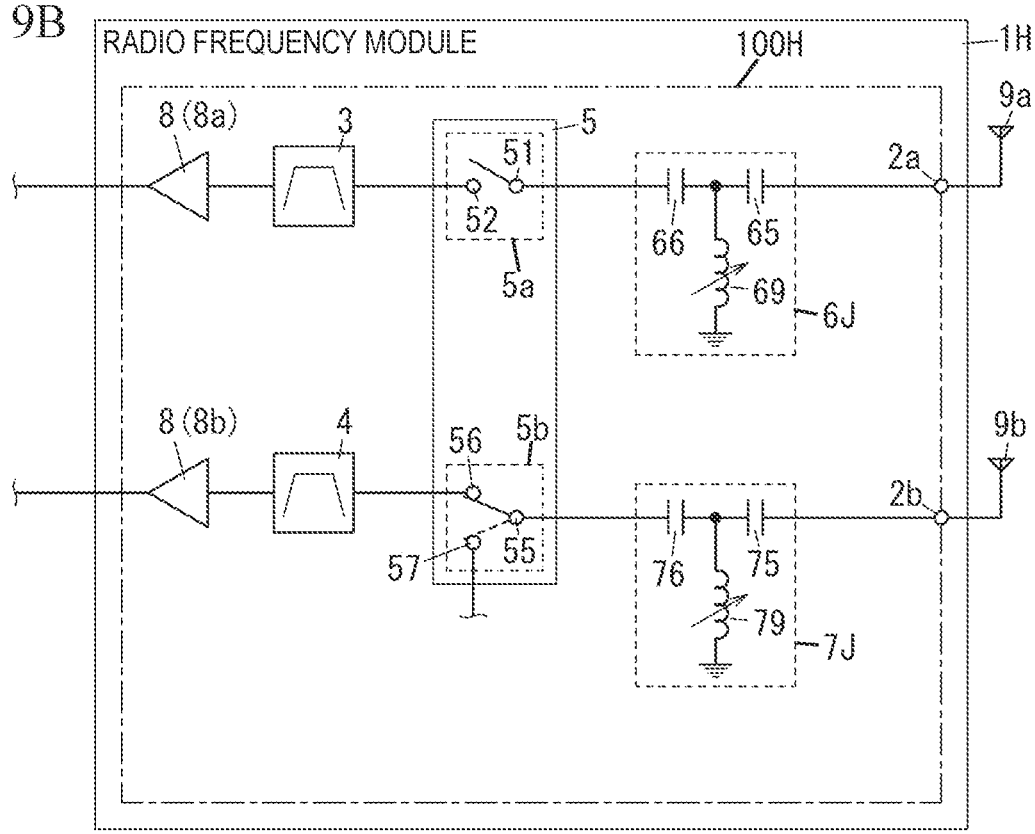
FIG. 9B is a diagram for explaining a circuit configuration of a radio frequency module according to Modification 2 of Embodiment 2.

The radio frequency module 1H (reception module 100H thereof) may include a first filter 6J and a second filter 7J illustrated in FIG. 9B instead of the first filter 6H and the second filter 7H.

Similar to the first filter 6H, the first filter 6J is provided at a preceding stage of the first switch 5a in the first reception path R1. The first filter 6J is a high pass filter, for example. The first filter 6J includes a first capacitor 65, a second capacitor 66, and an inductor 69. The first capacitor 65 and the second capacitor 66 are connected in series between the first antenna terminal 2a and the first switch 5a, and on the first reception path R1. One end of the inductor 69 is connected between the first capacitor 65 and the second capacitor 66. The other end of the inductor 69 is connected to the ground. The inductor 69 is a variable inductor and is configured such that the value of the inductor 69 may be varied. That is, the first filter 6J is configured such that the frequency band of a signal to be attenuated is variable. The first filter 6J may change the band of a signal to be attenuated by varying the value of the inductor 69. In the present modification, the value of the inductor 69 is set such that a signal of a frequency belonging to a band of ½ of the Band3 reception band is attenuated.

Similar to the second filter 7H, the second filter 7J is provided at a preceding stage of the second switch 5b in the second reception path R2. The second filter 7J is a high pass filter, for example. The second filter 7J includes a first capacitor 75, a second capacitor 76, and an inductor 79. The first capacitor 75 and the second capacitor 76 are connected in series between the second antenna terminal 2b and the second switch 5b, and on the second reception path R2. One end of the inductor 79 is connected between the first capacitor 75 and the second capacitor 76. The other end of the inductor 79 is connected to the ground. The inductor 79 is a variable inductor and is configured such that the value of the inductor 79 may be varied. That is, the second filter 7J is configured such that the frequency band of a signal to be attenuated is variable. The second filter 7J may change the band of a signal to be attenuated by varying the value of the inductor 79. In the present modification, the value of the inductor 79 is set such that a signal of a frequency belonging to a band of ½ of the n77 frequency band is attenuated.

With the configuration above, the band of the signal to be attenuated by the second filter 7B may be changed in accordance with the frequency band (transmission band) of the FDD communication performed at the same time as the TDD communication using n77 as the frequency band.

Note that, in the present modification, the inductor 69 and the inductor 79 are variable inductors, but are not limited thereto. At least one of the first capacitor 65 and the second capacitor 66 may be a variable capacitor. Further, at least one of the first capacitor 75 and the second capacitor 76 may be a variable capacitor. Alternatively, at least one of the first capacitor and the second capacitor, and the inductor may be made variable.

(2.3) Modification 3

Figure 10:
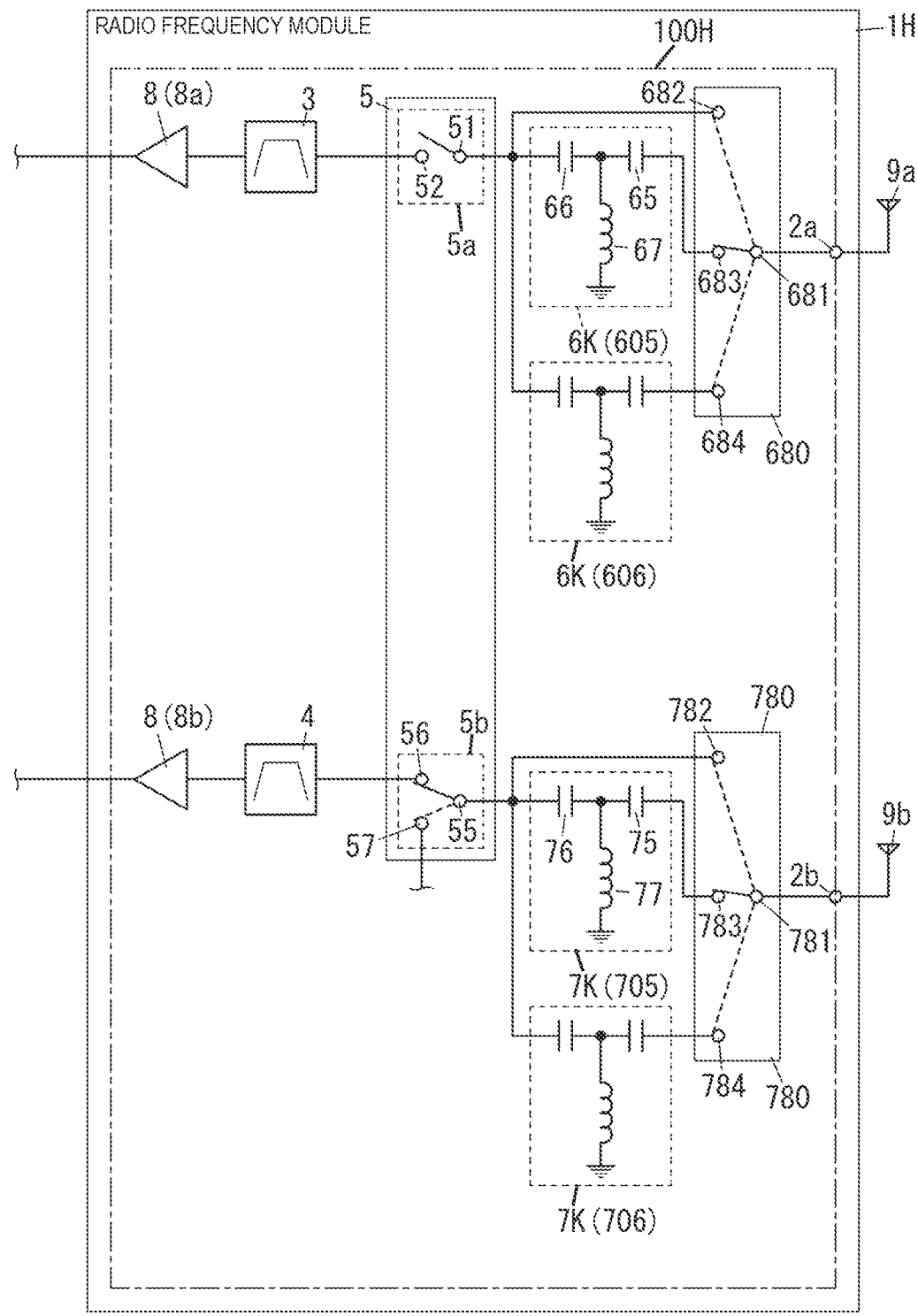
FIG. 10 is a diagram for explaining a circuit configuration of a radio frequency module according to Modification 3 of Embodiment 2.

The radio frequency module 1H (reception module 100H thereof) may include multiple sets of a first filter 6K and the first changeover switch 63 and multiple sets of a second filter 7K and the second changeover switch 73 (two sets each in illustrated example), instead of the first filter 6 and the second filter 7 as illustrated in FIG. 10. Note that, when the multiple first filters 6K need to be distinguished from each other, they are denoted as first filters 605 and 606. Further, when the multiple second filters 7K need to be distinguished from each other, they are denoted as second filters 705 and 705.

Similar to the first filter 6H, the multiple first filters 6K are provided at a preceding stage of the first switch 5a in the first reception path R1. The multiple first filters 6K are high pass filters, for example. Similar to the first filter 6H of Embodiment 2, each of the multiple first filters 6K includes a first capacitor 65, a second capacitor 66, and an inductor 67. The first capacitor 65 and the second capacitor 66 are connected in series, between the first switch 5a and the first antenna terminal 2a, between the first antenna terminal 2a and the first switch 5a, and on the first reception path R1. One end of the inductor 67 is connected between the first capacitor 65 and the second capacitor 66. The other end of the inductor 67 is connected to the ground.

The multiple first filters 6K have different bands of signals to attenuate. In other words, the multiple first filters 6K attenuate signals in the bands different from each other. In the present modification, the first filter 605 of the multiple first filters 6K attenuates a signal of a frequency belonging to a band of ½ of the Band3 reception band.

A first changeover switch 680 is provided between the first capacitor 65 and the first switch 5a. The first changeover switch 680 changes over the paths from the first antenna terminal 2a to the first switch 5a. The first changeover switch 680 has a common terminal 681 and multiple (three in illustrated example) selection terminals 682, 683, and 684. The common terminal 681 is electrically connected to the first antenna terminal 2a. The selection terminal 682 is electrically connected to the common terminal 51 of the first switch 5a without necessarily through the first filter 6K. The selection terminal 683 is electrically connected to the first capacitor 65 of the first filter 605. The selection terminal 684 is electrically connected to the first capacitor 65 of the first filter 606. The first changeover switch 680 selects at least one of the multiple selection terminals 682, 683, and 684 as the connection destination of the common terminal 681. Note that the common terminal 681 is not limited to being directly connected to the antenna 9a. A filter, a coupler, or the like may be provided between the common terminal 681 and the antenna 9a.

Similar to the second filter 7H, the multiple second filters 7K are provided at a preceding stage of the second switch 5b in the second reception path R2. The multiple second filters 7K are high pass filters, for example. Similar to the second filter 7H of Embodiment 2, each of the multiple second filters 7I includes a first capacitor 75, a second capacitor 76, and an inductor 77. The first capacitor 75 and the second capacitor 76 are connected in series between the second antenna terminal 2b and the second switch 5b, and on the second reception path R2. One end of the inductor 77 is connected between the first capacitor 75 and the second capacitor 76. The other end of the inductor 77 is connected to the ground.

The multiple second filters 7K have different bands of signals to attenuate. In other words, the multiple second filters 7K attenuate signals in the bands different from each other. In the present modification, the second filter 705 of the multiple second filters 7K attenuates a signal of a frequency belonging to a band of ½ of the n77 reception band.

A second changeover switch 780 is provided between the first capacitor 75 and the second switch 5b. The second changeover switch 780 changes over the paths from the second antenna terminal 2b to the second switch 5b. The second changeover switch 780 has a common terminal 781 and multiple (three in illustrated example) selection terminals 782, 783, and 784. The common terminal 781 is electrically connected to the second antenna terminal 2b. The selection terminal 782 is electrically connected to the common terminal 55 of the second switch 5b without necessarily through the second filter 7K. The selection terminal 783 is electrically connected to the first capacitor 75 of the second filter 705. The selection terminal 784 is electrically connected to the first capacitor 75 of the second filter 706. The second changeover switch 780 selects at least one of the multiple selection terminals 782, 783, and 784 as the connection destination of the common terminal 781. Note that the common terminal 781 is not limited to being directly connected to the antenna 9b. A filter, a coupler, or the like may be provided between the common terminal 781 and the antenna 9b.

(2.4) Modification 4

Figure 11:
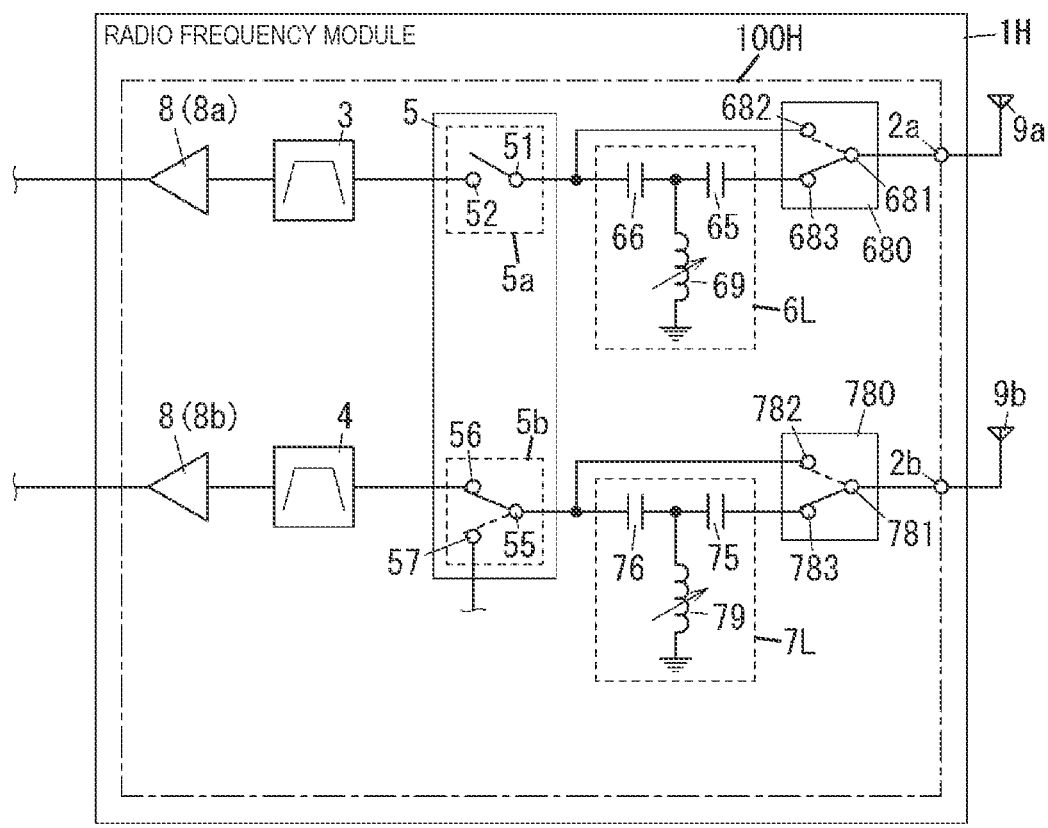
FIG. 11 is a diagram for explaining a circuit configuration of a radio frequency module according to Modification 4 of Embodiment 2.

The radio frequency module 1H (reception module 100H thereof) may include a first filter 6L, a second filter 7L, a first changeover switch 680, and a second changeover switch 780 illustrated in FIG. 11 instead of the first filter 6 and the second filter 7.

Similar to the first filter 6H, the first filter 6L is provided at a preceding stage of the first switch 5a in the first reception path R1. The first filter 6L is a high pass filter, for example. The first filter 6L includes a first capacitor 65, a second capacitor 66, and an inductor 69. The first capacitor 65 and the second capacitor 66 are connected in series between the first antenna terminal 2a and the first switch 5a, and on the first reception path R1. One end of the inductor 69 is connected between the first capacitor 65 and the second capacitor 66. The other end of the inductor 69 is connected to the ground. The inductor 69 is a variable inductor and is configured such that the value of the inductor 69 may be varied. That is, the first filter 6L is configured such that the frequency band of a signal to be attenuated is variable. The first filter 6L may change the band of a signal to be attenuated by varying the value of the inductor 69. In the present modification, the value of the inductor 69 is set such that a signal of a frequency belonging to a band of ½ of the Band3 reception band is attenuated.

Since the first changeover switch 680 is similar to the first changeover switch 680 of Modification 1 of Embodiment 2, a description thereof will be omitted here.

Similar to the first filter 6H, the second filter 7L is provided at a preceding stage of the second switch 5b in the second reception path R2. The second filter 7L is a high pass filter, for example. The second filter 7L includes a first capacitor 75, a second capacitor 76, and an inductor 79. The first capacitor 75 and the second capacitor 76 are connected in series between the second antenna terminal 2b and the second switch 5b, and on the second reception path R2. One end of the inductor 79 is connected between the first capacitor 75 and the second capacitor 76. The other end of the inductor 79 is connected to the ground. The inductor 79 is a variable inductor and is configured such that the value of the inductor 79 may be varied. That is, the second filter 7L is configured such that the frequency band of a signal to be attenuated is variable. The second filter 7L may change the band of a signal to be attenuated by varying the value of the inductor 79. In the present modification, the value of the inductor 79 is set such that a signal of a frequency belonging to a band of ½ of the n77 frequency band is attenuated.

Since the second changeover switch 780 is similar to the second changeover switch 780 of Modification 2 of Embodiment 2, a description thereof will be omitted here.

Note that, in the present modification, the inductor 69 and the inductor 79 are variable inductors, but are not limited thereto. At least one of the first capacitor 65 and the second capacitor 66 may be a variable capacitor. Further, at least one of the first capacitor 75 and the second capacitor 76 may be a variable capacitor. Alternatively, at least one of the first capacitor and the second capacitor, and the inductor may be made variable.

Further, the first filter 6D and the second filter 7D of the present modification may be applied to Modification 3 of Embodiment 2. That is, to the radio frequency module 1H (reception module 100H thereof) of Modification 3 of Embodiment 2, the first filter 6L may be applied instead of the first filter 6K of Modification 3 of Embodiment 2, and the second filter 7L may be applied instead of the second filter 7K of Modification 3, respectively.

(2.5) Modification 5

In Embodiment 2 described above, the radio frequency module 1H is configured to include the reception module 100H, but is not limited to the configuration. The radio frequency module 1H may include a transmission/reception module instead of the reception module 100H. The transmission/reception module of the present modification is realized, in the radio frequency module 1 in FIG. 5, by replacing the first filter 6 and the second filter 7 with the first filter 6H and the second filter 7H in FIG. 8.

In the present modification, the first filter and the second filter of Modification 1 to Modification 4 of Embodiment 2 may be applied instead of the filters of the present modification.

(2.6) Modification 6

In Modification 5 of Embodiment 2, the second reception filter 4 and the second transmission filter 4E (see FIG. 5) are configured as individual filters, but are not limited to the configuration. The second reception filter 4 and the second transmission filter 4E may be configured as a single filter.

The radio frequency module 1 (transmission/reception module thereof) of the present modification is realized, in the radio frequency module in FIG. 6, by replacing the filter 7F with the second filter 7H in FIG. 8.

In the radio frequency module 1 (transmission/reception module thereof) of the present modification, the second filter of Modification 1 to Modification 4 of Modification 2 may be applied instead of the second filter 7H of the present modification.

(2.7) Modification 7

In Embodiment 2 described above, the radio frequency module 1H is configured such that different antennas are used for communication in the first communication band (Band3) and communication in the second communication band (n77), but is not limited to the configuration.

The same antenna may be used for the communication in the first communication band (Band3) and the communication in the second communication band (n77). In the case above, the radio frequency module 1 of the present modification is realized, in the radio frequency module 1 in FIG. 7, by replacing the filter 7G with the second filter 7H in FIG. 8.

Note that, in the radio frequency module of the present modification, the second filter of Modification 1 to Modification 4 described above may be applied instead of the second filter 7H of the present modification.

(2.8) Modification 8

In Embodiment 2 described above, the first filter 6H is configured to attenuate a signal of a frequency belonging to a band of ½ of the reception band of the first communication band (Band3), but is not limited to the configuration. The first filter 6H may be configured to attenuate a signal of a frequency belonging to a band lower than the reception band of the first communication band (Band3).

Similarly, the second filter 7H may be configured to attenuate a signal of a frequency belonging to a band lower than the frequency band of the second communication band (n77).

Further, the first filters described in Modification 1 to Modification 5 of Embodiment 2 may similarly be configured to attenuate a signal of a frequency belonging to a band lower than the reception band of the first communication band (Band3). The second filters described in Modification 1 to Modification 5 of Embodiment 2 may similarly be configured to attenuate a signal of a frequency belonging to a band lower than the frequency band of the second communication band (n77).

Further, the filters described in Modification 6 to Modification 7 of Embodiment 2 may similarly be configured to attenuate a signal of a frequency belonging to a band lower than the frequency band of the second communication band (n77).

CONCLUSION

As described above, the radio frequency module (1; 1H) of a first aspect includes a switch (second switch 5b, path changeover switch 560, for example), a reception filter (second reception filter 4, for example), a low-noise amplifier (second low-noise amplifier 8b, for example), and a filter (second filter 7; 7A; 7B; 7C; 7D; 7H; 7I; 7J; 7K; 7L, or filter 7G, for example). In the communication based on a time division duplex system, the switch is configured to change over a transmission path of a transmission signal and a reception path of a reception signal. The reception filter is provided at a subsequent stage of the switch and is configured to pass a reception signal in a predetermined frequency band. The low-noise amplifier is configured to amplify a reception signal that has passed through the reception filter. The filter is provided at a preceding stage of the switch in a reception path (second reception path R2, for example).

With the configuration above, since a signal in an unnecessary band is attenuated by the filter, a harmonic wave of a signal in an unnecessary band due to the nonlinear characteristics of the switch is not generated. Accordingly, a decrease in reception sensitivity may further be suppressed.

A radio frequency module (1) of a second aspect includes a switch (an antenna switch 500, for example), a transmission/reception filter (4F), a low-noise amplifier (second low-noise amplifier 8b, for example), and a filter (filter 7F, for example). The switch is configured to change over the connection destination of the antenna terminal (2). The transmission/reception filter (4F) is provided at a subsequent stage of the switch and is configured to pass a reception signal in a predetermined frequency band and a transmission signal in a predetermined frequency band. The low-noise amplifier is configured to amplify a reception signal that has passed through the transmission/reception filter (4F). The filter is provided at a preceding stage of the switch in a reception path (path R21, for example) of a reception signal.

With the configuration above, since a signal in an unnecessary band is attenuated by the filter, a harmonic wave of a signal in an unnecessary band due to the nonlinear characteristics of the switch is not generated. Accordingly, a decrease in reception sensitivity may further be suppressed.

A radio frequency module (1; 1H) of a third aspect further includes a changeover switch (63; 650) in the first or second aspect. The changeover switch (second changeover switch 73; 780, for example) changes over the connection and disconnection between a filter (second filter 7A; 7C; 7D; 7I; 7K; 7L, for example) and a reception path.

With the configuration above, it is possible to change over the connection or disconnection between the filter and the reception path in accordance with a communication mode.

In a radio frequency module (1; 1H) of a fourth aspect, in any of the first to third aspects, a filter (second filter 7B; 7D; 7J; 7L, for example) is configured such that a band of a signal to be attenuated is variable.

With the configuration above, the band of a signal to be attenuated by the filter may be changed in accordance with the communication mode. For example, when simultaneous communication is performed in TDD and FDD, a band of a signal to pass through the filter may be changed in accordance with the frequency band used in FDD.

Specifically, the band of a signal to pass through a filter may be made the same as the transmission band used in FDD.

In a radio frequency module (1; 1H) of a fifth aspect, in the third aspect, multiple sets of a filter (second filter 7C; 7K, for example) and a changeover filter are provided. The multiple filters have different bands of signals to attenuate.

With the configuration above, a filter to be connected to a reception path may be changed over in accordance with the communication mode. For example, when simultaneous communication is performed in TDD and FDD, the filter to be connected to a reception path may be changed over in accordance with the frequency band used in FDD. Specifically, when the frequency band used in FDD has Band1 and Band3, the filter to be connected to the reception path may be changed over between a case of using Band1 and a case of using Band1.

In a radio frequency module (1; 1H) of a sixth aspect, in any of the first to fifth aspects, a filter attenuates a signal in the second frequency band that is lower than the first frequency band as a predetermined frequency band.

With the configuration above, a decrease in reception sensitivity may further be suppressed.

In a management system (1; 1H) of a seventh aspect, in the sixth aspect, the second frequency band includes a frequency of half the reception signal frequency.

With the configuration above, a second harmonic wave of a signal in an unnecessary band due to the nonlinear characteristics of a switch is not generated. Accordingly, by providing a filter, the generation of a second harmonic wave of a signal in an unnecessary band may be prevented.

In a radio frequency module (1; 1H) of an eighth aspect, in any of the first to seventh aspects, the filter is a notch filter (second filter 7; 7A; 7B; 7C; 7D, or filter 7G, for example) or a high pass filter (second filter 7H; 7I; 7J; 7K; 7L, for example).

With the configuration above, a signal in an unnecessary band may be attenuated by the filter.

A communication device (10; 10H) of a ninth aspect includes the radio frequency module (1; 1H) of any of the first to eighth aspects, and a signal processing circuit (80) configured to process a signal passing through the radio frequency module (1; 1H).

With the configuration above, a decrease in reception sensitivity may further be suppressed.

REFERENCE SIGNS LIST

1, 1H RADIO FREQUENCY MODULE
2 ANTENNA TERMINAL
2a FIRST ANTENNA TERMINAL
2b SECOND ANTENNA TERMINAL
3 FIRST RECEPTION FILTER
3E FIRST TRANSMISSION FILTER
3F RECEPTION FILTER
4 SECOND RECEPTION FILTER
4E SECOND TRANSMISSION FILTER
4F TRANSMISSION/RECEPTION FILTER
5 SWITCH
5a FIRST SWITCH
5b SECOND SWITCH
6, 6A, 6B, 6C, 6D, 6H, 6I, 6J, 6K, 6L, 601, 602, 605, 606 FIRST FILTER
7, 7A, 7B, 7C, 7D, 7H, 7I, 7J, 7K, 7L, 701, 702, 705, 706 SECOND FILTER
7F, 7G FILTER
8 AMPLIFIER
8a FIRST LOW-NOISE AMPLIFIER
8b SECOND LOW-NOISE AMPLIFIER
8c SECOND POWER AMPLIFIER (POWER AMPLIFIER)
8d FIRST POWER AMPLIFIER
9, 9a, 9b ANTENNA
10, 10H COMMUNICATION DEVICE
51, 55 COMMON TERMINAL
52, 56, 57 SELECTION TERMINAL
61, 71 INDUCTOR
62, 62B, 62D, 72, 72B, 72D CAPACITOR
63 FIRST CHANGEOVER SWITCH
65, 75 FIRST CAPACITOR
66, 76 SECOND CAPACITOR
67, 69, 77, 79 INDUCTOR
73 SECOND CHANGEOVER SWITCH
80 SIGNAL PROCESSING CIRCUIT
81 BASEBAND SIGNAL PROCESSING CIRCUIT
82 RF SIGNAL PROCESSING CIRCUIT
100, 100G, 100H RECEPTION MODULE
100E, 100F TRANSMISSION/RECEPTION MODULE
500, 550 ANTENNA SWITCH
510 CHANGEOVER SWITCH
560 PATH CHANGEOVER SWITCH
680 FIRST CHANGEOVER SWITCH
780 SECOND CHANGEOVER SWITCH
501, 511, 551, 561, 681, 781 COMMON TERMINAL
502, 503, 512, 513, 552, 553, 562, 563, 682, 683, 684, 782, 783, 784 SELECTION TERMINAL
R1 FIRST RECEPTION PATH
R2 SECOND RECEPTION PATH
R3 TRANSMISSION PATH
R11 THIRD RECEPTION PATH
R21 PATH
R22 RECEPTION PATH
R32 TRANSMISSION PATH

The invention claimed is:

1. A radio frequency module, comprising:
a switch configured to selectively change between a transmission path of a transmission signal and a reception path of a reception signal in communication based on a time division duplex system;
a reception filter at a stage subsequent to the switch, the reception filter being configured to pass the reception signal in a predetermined frequency band;
a low-noise amplifier configured to amplify the reception signal that has passed through the reception filter; and
a filter between an antenna terminal and the switch, at a stage preceding the switch in the reception path,
wherein the filter is configured to attenuate a signal in a second frequency band, the second frequency band being lower than the predetermined frequency band.

2. The radio frequency module according to claim 1, further comprising:
a changeover switch configured to selectively connect and disconnect the filter to the reception path.

3. The radio frequency module according to claim 1, wherein an attenuation band of the filter is variable.

4. The radio frequency module according to claim 2, comprising a plurality of sets of the filter and the changeover switch,
wherein the plurality of filters of the plurality of sets have different attenuation bands.

5. The radio frequency module according to claim 1, wherein the second frequency band comprises a frequency that is half of a frequency of the reception signal.

6. The radio frequency module according to claim 1, wherein the filter is a notch filter or a high pass filter.

7. A communication device, comprising:
the radio frequency module according to claim 1; and
a signal processing circuit configured to process a signal passing through the radio frequency module.

8. A radio frequency module, comprising:
a switch configured to selectively change a connection destination of an antenna terminal;
a transmission/reception filter at a stage subsequent to the switch, the transmission/reception filter being configured to pass a reception signal in a predetermined frequency band and to pass a transmission signal in the predetermined frequency band;
a low-noise amplifier configured to amplify the reception signal that has passed through the transmission/reception filter; and
a filter between the antenna terminal and the switch, at a stage preceding the switch in a reception path of the reception signal,
wherein the filter is configured to attenuate a signal in a second frequency band, the second frequency band being lower than the predetermined frequency band.

9. The radio frequency module according to claim 8, further comprising:
a changeover switch configured to selectively connect and disconnect the filter to the reception path.

10. The radio frequency module according to claim 8, wherein an attenuation band of the filter is variable.

11. The radio frequency module according to claim 9, comprising a plurality of sets of the filter and the changeover switch,
wherein the plurality of filters of the plurality of sets have different attenuation bands.

12. The radio frequency module according to claim 8, wherein the second frequency band comprises a frequency that is half of a frequency of the reception signal.

13. The radio frequency module according to claim 8, wherein the filter is a notch filter or a high pass filter.

14. A communication device, comprising:
the radio frequency module according to claim 8; and
a signal processing circuit configured to process a signal passing through the radio frequency module.

15. A radio frequency module, comprising:
a switch configured to selectively change between a transmission path of a transmission signal and a reception path of a reception signal in communication based on a time division duplex system;
a reception filter at a stage subsequent to the switch, the reception filter being configured to pass the reception signal in a predetermined frequency band;
a low-noise amplifier configured to amplify the reception signal that has passed through the reception filter; and
a plurality of sets of:
a filter between an antenna terminal and the switch, at a stage preceding the switch in the reception path; and
a changeover switch configured to selectively connect and disconnect the filter to the reception path,
wherein the plurality of filters of the plurality of sets have different attenuation bands.

* * * * *